United States Patent
Giles et al.

(10) Patent No.: US 11,428,666 B2
(45) Date of Patent: Aug. 30, 2022

(54) DEVICE FOR PERFORMING FIELD ASYMMETRIC WAVEFORM ION MOBILITY SPECTROMETRY

(71) Applicant: SHIMADZU CORPORATION, Kyoto (JP)

(72) Inventors: Roger Giles, Manchester (GB); Roch Andrzejewski, Manchester (GB)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/944,534

(22) Filed: Jul. 31, 2020

(65) Prior Publication Data

US 2021/0063351 A1   Mar. 4, 2021

(30) Foreign Application Priority Data

Aug. 30, 2019 (GB) ..................... 1912481

(51) Int. Cl.
  *H01J 37/20* (2006.01)
  *G01N 27/624* (2021.01)
  *H01J 49/36* (2006.01)

(52) U.S. Cl.
  CPC ............ *G01N 27/624* (2013.01); *H01J 49/36* (2013.01)

(58) Field of Classification Search
  CPC ........ G01N 27/624; H01J 49/10; H01J 49/36; H01J 49/062
  See application file for complete search history.

(56) References Cited

U.S. PATENT DOCUMENTS

| 6,107,628 | A | 8/2000 | Smith et al. |
| 7,045,778 | B2 | 5/2006 | Guevremont |

(Continued)

FOREIGN PATENT DOCUMENTS

| JP | 2012-525672 A | 10/2012 |
| WO | 2008/067331 A2 | 6/2008 |

(Continued)

OTHER PUBLICATIONS

Alexandre A. Shvartsburg et al., "High-Resolution Field Asymmetric Waveform Ion Mobility Spectrometry Using New Planar Geometry Analyzers", Anal. Chem., 2006, pp. 3706-3714, vol. 78.

(Continued)

*Primary Examiner* — Robert H Kim
*Assistant Examiner* — Hsien C Tsai
(74) *Attorney, Agent, or Firm* — Sughre Mion, PLLC

(57) ABSTRACT

A device for performing field asymmetric waveform ion mobility spectrometry, "FAIMS" including first and second segmented planar electrodes, each electrode including three or more segments and extending in a direction parallel to an analytical axis of the device, the first and second segmented electrodes are separated from each other to provide an analytical gap therebetween; and propelling means for propelling ions through the analytical gap in a direction parallel to the analytical axis. The device is configured to operate in: a FAIMS mode in which a power supply applies voltage waveforms to the segments to produce an asymmetric time dependent electric field in the analytical gap for FAIMS analysis of ions propelled through the analytical gap; and a transparent mode in which the power supply applies voltage waveforms to the to produce a confining electric field in the analytical gap for focussing ions towards the longitudinal axis.

14 Claims, 15 Drawing Sheets

(56) References Cited

U.S. PATENT DOCUMENTS

| | | | |
|---|---|---|---|
| 7,550,717 | B1 | 6/2009 | Belford et al. |
| 7,638,765 | B1* | 12/2009 | Belford ................ G01N 27/624 |
| | | | 250/281 |
| 7,863,562 | B2 | 1/2011 | Wollnik et al. |
| 8,610,054 | B2* | 12/2013 | Giles .................... G01N 27/624 |
| | | | 250/282 |
| 2008/0315087 | A1* | 12/2008 | Wollnik .............. G01N 27/624 |
| | | | 250/292 |
| 2016/0133451 | A1* | 5/2016 | Vidal-de-Miguel ........................ |
| | | | G01N 27/622 |
| | | | 250/423 R |

FOREIGN PATENT DOCUMENTS

| | | |
|---|---|---|
| WO | 2009/002626 A1 | 12/2008 |
| WO | 2010/125357 A2 | 11/2010 |
| WO | 2017/062102 A9 | 4/2017 |

OTHER PUBLICATIONS

Alexandre A. Shvartsburg et al., "Differential Ion Mobility Separations in the Low-Pressure Regime", Anal. Chem., 2018, pp. 936-943, vol. 90.

Alexandre A. Shvartsburg et al., "High-Definition Differential Ion Mobility Spectrometry with Resolving Power up to 500", J. Am. Soc. Mass Spectrom., 2013, pp. 109-114, vol. 24.

A.V. Tolmachev et al., "A collisional focusing ion guide for coupling an atmospheric pressure ion source to a mass spectrometer", Nuclear Instruments and Methods in Physics Research B, 1997, pp. 112-119, vol. 124.

I.A. Buryakov et al., "A new method of separation of multi-atomic ions by mobility at atmospheric pressure using a high-frequency amplitude-asymmetric strong electric field", International Journal of Mass Spectrometry and Ion Processes, 1993, pp. 143-148, vol. 128.

Randy W. Purves et al., "Mass spectrometric characterization of a high-field asymmetric waveform ion mobility spectrometer", Review of Scientific Instruments, Dec. 1998, pp. 4094-4105, vol. 69, No. 12.

"Part 1. Separation of Ions with FAIMS", pp. 1-2, www.faims.com/howpart1.htm.

Yehia Ibrahim et al., "Improving Mass Spectrometer Sensitivity Using a High-Pressure Electrodynamic Ion Funnel Interface", J Am Soc Mass Spectrom, 2006, pp. 1299-1305, vol. 17.

British Search Report of GB1912481.7 dated Feb. 24, 2020.

Communication dated Oct. 5, 2021 from the Japanese Patent Office in Japanese Application No. 2020-133344.

* cited by examiner

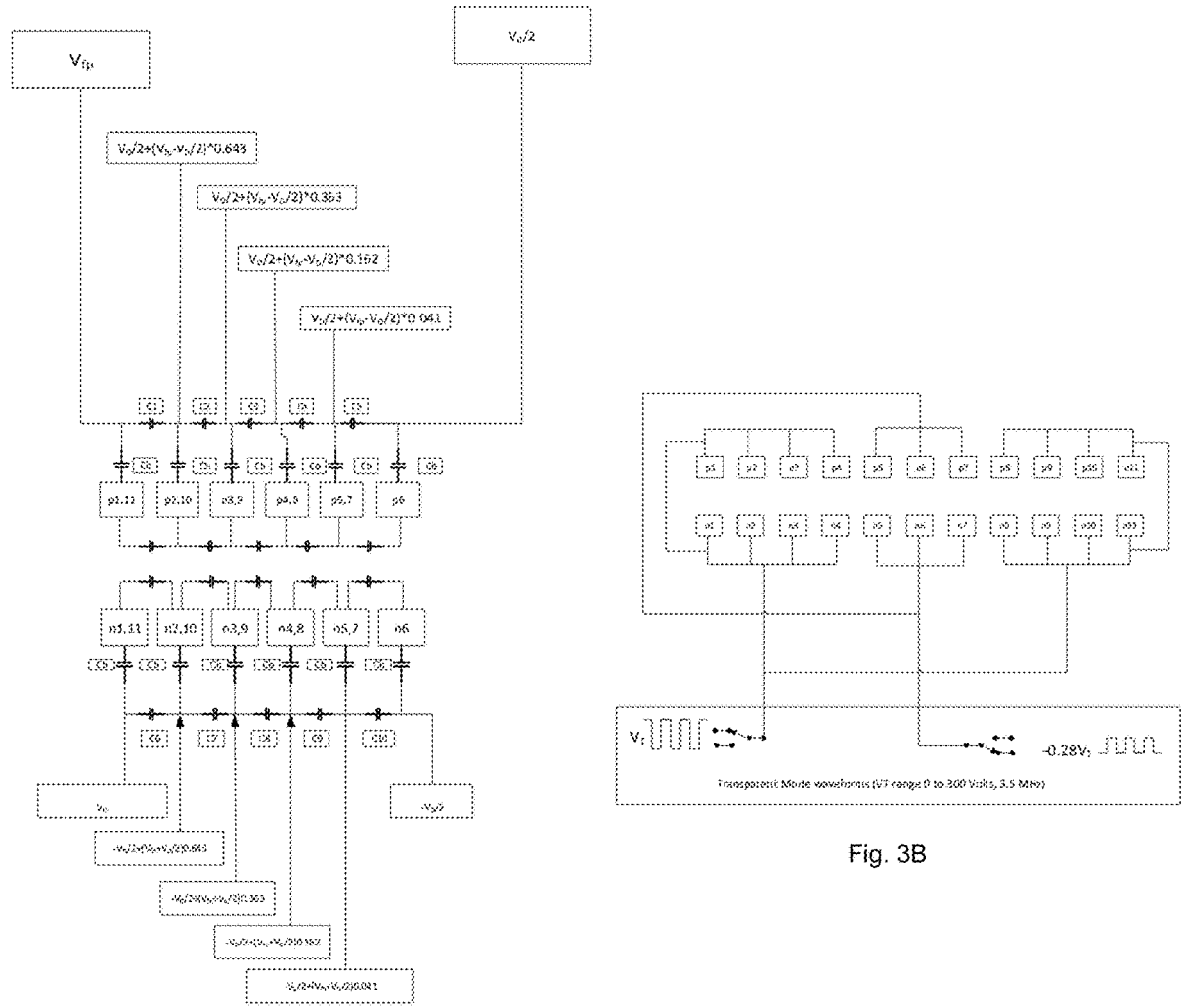
Fig. 3A
Fig. 3B
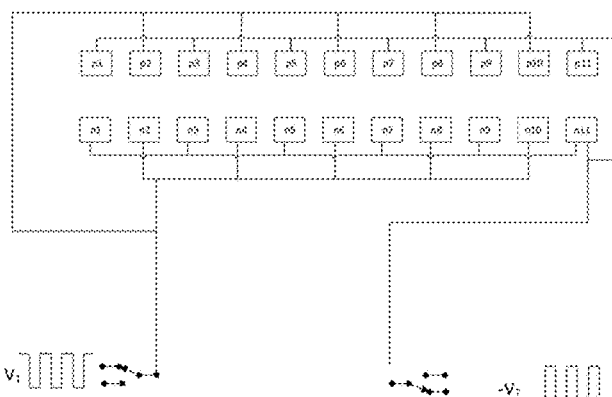
Fig. 3C

Fig. 5A(ii)

Fig. 5A(iii)

Fig. 5A(iv)

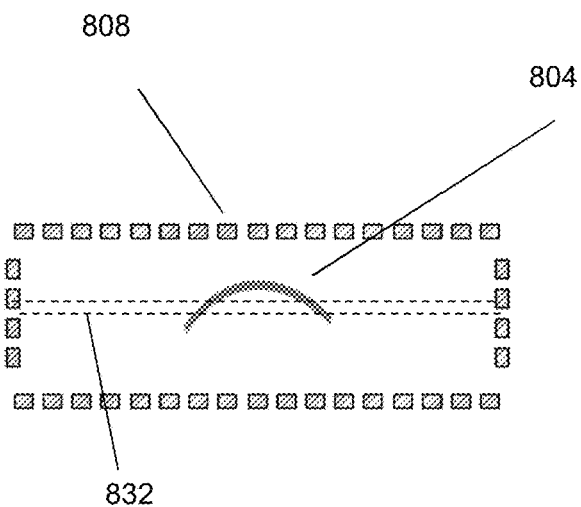
Fig. 8A(i)
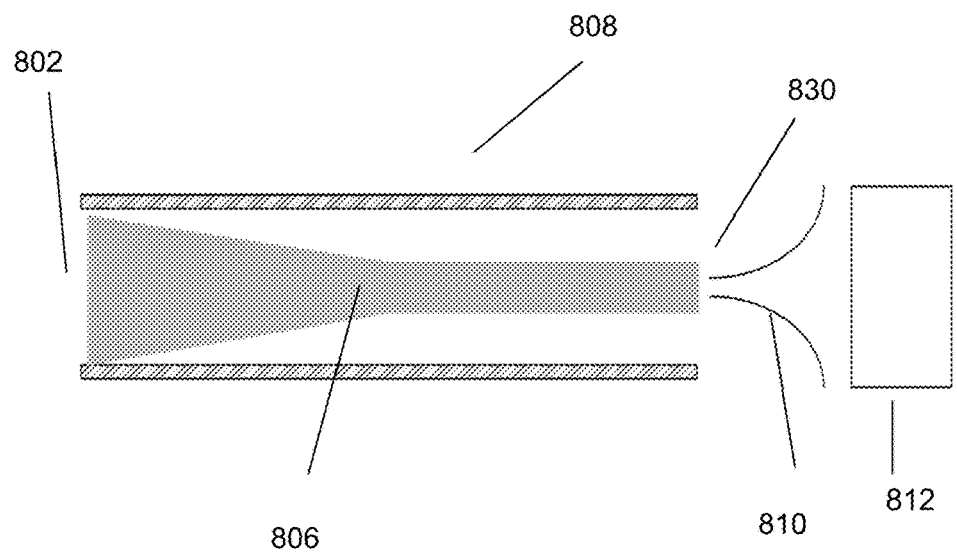
Fig. 8A(ii)
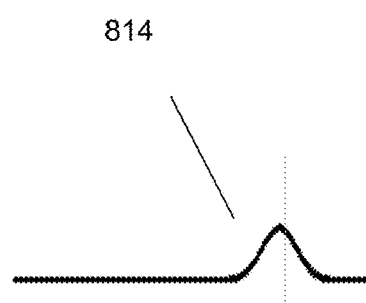
Fig. 8A(iii)

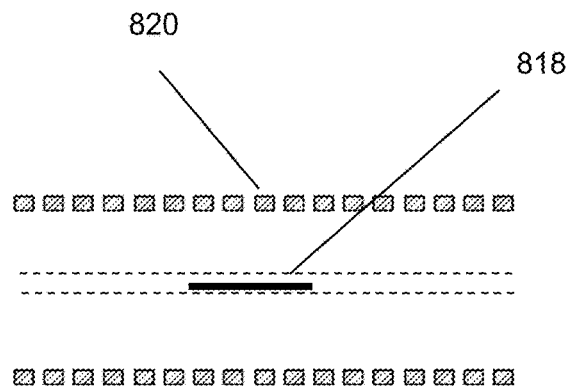
Fig. 8B(i)
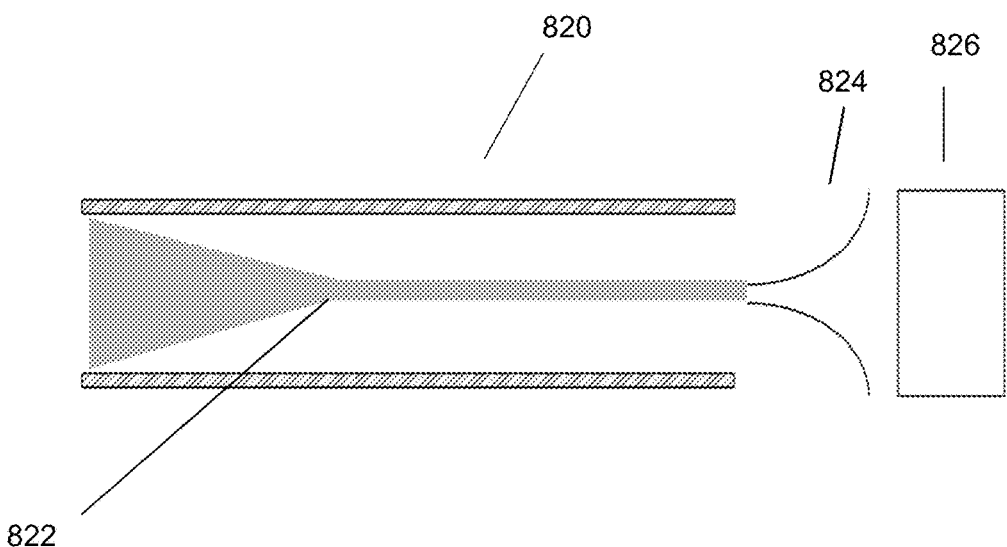
Fig. 8B(ii)
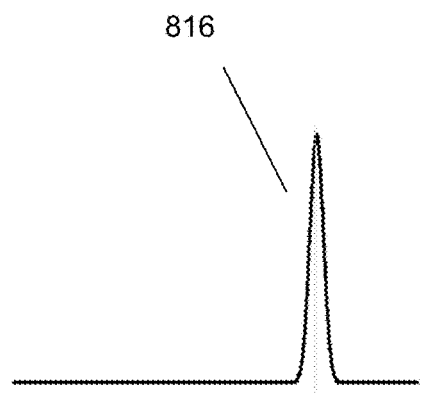
Fig. 8B(iii)

DEVICE FOR PERFORMING FIELD ASYMMETRIC WAVEFORM ION MOBILITY SPECTROMETRY

CROSS REFERENCE TO RELATED APPLICATIONS

This application claims priority to British Patent Application No. 1912481.7, filed Aug. 30, 2019, the contents of which are incorporated herein by reference in their entirety.

FIELD OF THE INVENTION

The present invention relates to a device for performing field asymmetric waveform ion mobility spectrometry, "FAIMS".

BACKGROUND

Ion mobility spectrometry ("IMS") is an analytical technique used to separate ions in the gas phase based on their mobility in a carrier buffer gas.

In linear IMS, ions are separated according to their absolute mobility, K.

In non-linear IMS, ions are separated according to their response to a varying electric field.

Field asymmetric waveform ion mobility spectrometry ("FAIMS") [3], also known as differential mobility spectrometry ("DMS") [4], is an established non-linear IMS method to separate ions by differences of mobility in gases as a function of electric field intensity, as ions pass through an analytical gap (sometimes known as a "FAIMS gap"). These differences depend on the geometry and physical & chemical properties of ions and gas molecules, but are only weakly correlated with the ion mass. The resulting strong orthogonality to mass spectrometry (MS) makes FAIMS/MS systems (in which ions are separated by FAIMS and then MS) a powerful analytical approach. Multiple FAIMS/MS systems have been commercialised. However, the customer acceptance remains limited so far, in large part because of an inability to achieve satisfactory MS performance without FAIMS separation (that is, to obtain satisfactory MS performance whilst the FAIMS device of the FAIMS/MS system is operating in a "transparent mode" where FAIMS separation is turned off) other than by physically removing the FAIMS device from the FAIMS/MS system.

All FAIMS stages presently commercialised by major vendors (stand-alone or coupled to MS) operate at ambient pressure and employ a waveform of bisinusoidal (the superposition of two harmonics) or close profile with fixed frequency and HF/LF ratio. This profile deviates significantly from the ideal rectangular waveform that would theoretically maximize the resolving power.

Reference [1] describes use of vacuum differential ion mobility device (DMS) combined with a mass spectrometer (see claim 1). In particular, [1] describes the use of various DMS configurations including the multipole format and the planar format. [1] further teaches that a multipole format may provide two modes of operation, one providing FAIMS separation of ion (a separation mode) and one that transmits ions without FAIMS separation (a transparent mode). Operating pressure and a method for providing the FAIMS power supply unit (PSU) are also disclosed. Within [1] a transparent mode is achieved by operating a coaxial multipole as a quadrupole with the waveform set to a 50% duty cycle that allows transportation of all ions Reference [2] describes segmented electrodes for differential ion mobility devices. In this disclosure, it is mentioned that voltages may be applied to form a field that "equals that formed between two concentric cylinder electrodes" and "having a variable radius of curvature" (see col. 4 lines 59-67. Thus [2] points out that a planar FAIMS can be used to create a field that could also be created between two concentric cylinder electrodes, albeit without teaching why this might be done.

The present invention has been devised in the light of the above considerations.

SUMMARY OF THE INVENTION

A first aspect of the invention provides:

A device for performing field asymmetric waveform ion mobility spectrometry, "FAIMS", the device comprising:
a first segmented planar electrode including three or more segments, wherein the segments of the first segmented planar electrode are arranged in a first plane and extend in a direction parallel to an analytical axis of the device;
a second segmented planar electrode including three or more segments, wherein the segments of the second segmented planar electrode are arranged in a second plane and extend in a direction parallel to the analytical axis of the device, wherein the first segmented planar electrode and the second segmented electrode are separated from each other to provide an analytical gap therebetween;
propelling means for propelling ions through the analytical gap in a direction parallel to the analytical axis of the device; and
a power supply;
wherein the device is configured to operate in:
a FAIMS mode in which the power supply applies a first set of voltage waveforms to the segments of the first and second segmented planar electrodes so as to produce an asymmetric time dependent electric field in the analytical gap for FAIMS analysis of ions propelled through the analytical gap by the propelling means;
a transparent mode in which the power supply applies a second set of voltage waveforms to the segments of the first and second segmented planar electrodes so as to produce a confining electric field in the analytical gap for focussing ions towards the longitudinal axis.

The present inventors have found that a pair of segmented planar electrodes are particularly well suited to providing good LP-FAIMS separation with an effective transparent mode.

Note here that neither [1] nor [2] disclose segmented planar electrodes being used in a transparent mode.

According to principles known in the art, the asymmetric time dependent electric field produced in the analytical gap (when the device operates in the FAIMS mode) may repeatedly oscillate (change back and forth) between a high field ("HF") state and low field ("LF") state, wherein the asymmetric time dependent electric field repeats every time period T at a predetermined frequency f. For a first fraction of the time period T of the asymmetric time dependent electric field, a set of high field ("HF") voltages may be applied to the segments to produce the HF state. For a second fraction of the time period T of the asymmetric time dependent electric field, a set of low field ("LF") voltages may be applied to the segments to produce the LF state.

Thus, for each segment, the (respective) first voltage waveform applied to that segment in the FAIMS mode may include an HF voltage configured to produce the HF state and an LF voltage configured to produce the LF state. For each segment, the HF voltage and LF voltage applied to the segment may be different in amplitude and polarity. In particular, the HF voltage may be larger in amplitude than the LF voltage, but applied for a shorter amount of time. However, the shape (i.e the electrical field contours) of the asymmetric time dependent electric field produced in the analytical gap should be the same in both the HF and the LF states.

The fraction of time spent producing the HF field (by applying the HF voltages to the segments) within the time period T of the asymmetric time dependent electric field (i.e. the "first fraction" referred to in the previous paragraph) is known as the duty cycle, d. The ratio of the time spent producing the LF field (by applying the LF voltages to the segments) vs the time spent producing the HF field (by applying the HF voltages to the segments) within the time period T of the asymmetric time dependent electric field is known as the f-value, where f-value=(1−d)/d (e.g. d=0.2 would give an f-value of 4).

As is known in the art, for a FAIMS device employing non-segmented planar electrodes, a "dispersion voltage" ("DV") may be defined which is the largest amplitude voltage applied to the planar electrodes of the device to obtain the HF state.

In the case of a FAIMS device employing segmented planar electrodes, the dispersion voltage may be defined as the largest amplitude voltage applied to a segment (typically a central segment) of the segmented planar electrodes to obtain the HF state.

In any aspect of this invention, the power supply may be configured to apply a set of additional DC voltages, referred to as the compensation voltages ("CVs" or just "CV"), to all the segments at the same time as the first set of voltage waveforms when the device is operating in the FAIMS mode. For avoidance of any doubt, the set of DC voltages (CVs) applied to the segments may include different DC voltages for different segments, i.e. the DC voltage applied to each segment need not be the same as the DC voltage applied to other segments (although the DC voltages could be the same as each other in some examples, e.g. where focusing is not required). As is known in the art, the CVs select which ions pass through the analytical gap and can be fixed in time, or scanned (progressively varied in time) to obtain a spectrum, as explained e.g. in [5].

If the device is configured to provide focusing (see second and third aspects of the invention, discussed below), an electric field produced by applying CVs to all segments preferably provides a field that has substantially the same form as that produced by applying the first set of voltage waveforms to the segments of the first and second segmented planar electrodes. A skilled person could straightforwardly implement CVs to produce a field having such a form, e.g. via independently controlled power supply units or voltage dividers.

Preferably, the device comprises a gas controller for controlling the gas pressure in the analytical gap.

Preferably the gas controller is configured to provide a gas pressure in the analytical gap such that the gas pressure in the analytical gap is lower in the transparent mode compared with the FAIMS mode.

Preferably, the gas controller is configured to provide, in the FAIMS mode, a gas pressure in the analytical gap that is: 1-200 mbar, more preferably 5-100 mbar, more preferably 5-50 mbar.

If the device is configured for use in separation of multiply charged proteins, the pressure controller may be configured to provide, in the FAIMS mode, a gas pressure in the analytical gap that is 1-20 mbar.

Preferably, the gas controller is configured to control the supply of gases to the analytical gap such that the analytical gap contains a mixture of gases. The mixture of gases may include two or more of $N_2$, H, He. The mixture of gases may be He and $N_2$, or H and $N_2$.

Preferably, the pressure controller is configured to provide, in the transparent mode, a gas pressure in the analytical gap that is 20 mbar or less, more preferably 10 mbar or less, more preferably 5 mbar or less. [it may be different, and preferably lower than the pressure used for FAIMS mode]

Preferably, the first set of voltage waveforms repeat at a first frequency and the second set of voltage waveforms repeat at a second frequency. Preferably, the first frequency is lower than the second frequency.

The first frequency may be in the range 5 kHz-5 MHz, may be in range 10 kHz-1 MHz, may be in range 25 kHz-500 kHz.

The second frequency may be 500 kHz or higher, may be 1 MHz or higher, may be 2 MHz or higher, may be 3 MHz or higher.

The first voltage waveforms and the second voltage waveforms are preferably substantially rectangular.

The power supply may be a digital power supply. This is a particularly convenient way of allowing the first and second voltage waveforms to have different frequencies, and substantially rectangular waveforms (see above).

The device is preferably configured to operate in the FAIMS mode with a duty cycle of less than or greater than 0.5.

The power supply may be configured to apply the first set of voltage waveforms to the segments of the first and second segmented planar electrodes by producing one or more RF voltage waveforms and applying said RF voltage waveforms to the segments of the first and second segmented planar electrodes via an arrangement of capacitive dividers.

The power supply may be configured to apply the second set of voltage waveforms to the segments of the first and second segmented planar electrodes by producing one or more RF voltage waveforms and applying said RF voltage waveforms to the segments of the first and second segmented planar electrodes without using the arrangement of capacitive dividers (e.g. direct to the segments).

The power supply is preferably configured to change the frequency of voltage waveforms applied to the segments of the segmented planar electrodes from a first frequency value to a second frequency value substantially instantly. Here, substantially instantly may refer to the change occurring within one cycle of the voltage waveforms prior to the change in frequency (i.e. within 1/f1, where f1 is the first frequency value). This can most conveniently be achieved if the power supply is digitally controlled. The power supply may be configured to change the frequency from the first frequency value to the second frequency value according to user input, e.g. via software.

The power supply is preferably to configured to change the f-value of voltage waveforms applied to the segments of the segmented planar electrodes from a first f-vale to a second f-value substantially instantly. Here, substantially instantly may refer to the change occurring within one cycle of the voltage waveforms prior to the change in f-value. This can most conveniently be achieved if the power supply is digitally controlled. The power supply may be configured to change the f-value from the first f-value to the second f-value according to user input, e.g. via software.

Preferably the second set of voltage waveforms applied to the segments of the first and second segmented planar electrodes in the transparent mode produce a quadrupolar field in the analytical gap in a plane orthogonal to the analytical axis of the device for focussing ions towards the analytical axis Other forms of confining fields would be apparent to the skilled person.

The second voltage waveforms (applied to the segments when the device operates in the transparent mode) may have a duty cycle of 0.5 (f-value=1).

Preferably, the first and second segmented planar electrodes are arranged on opposite sides of the analytical gap. The first and second planes are preferably parallel.

Herein, an analytical gap preferably extends in each of a gap height direction, a gap width direction, and a gap length direction. The segments of the first and second segmented planar electrodes are preferably distributed in the gap width direction, and extend in the gap length direction. The first and second segmented planar electrodes are preferably separated from each other in the gap height direction. The gap length direction is preferably parallel to the analytical axis.

The height of the analytical gap in the gap height direction ($d_g$) may be referred to herein as the gap height, or simply 'g'.

The width of the analytical gap in the gap width direction ($d_w$) may be referred to herein as the gap width, or simply 'w'.

The length of the analytical gap in the gap length direction ($d_l$) may be referred to herein as the gap length, or simply 'l'.

In some embodiments, $w \geq 3\ g$. In some embodiments, $w \geq 4\ g$.

If the first and second planes are parallel, the gap height direction preferably extends in a direction perpendicular to the first and second planes, the gap width direction preferably extends in a direction that is both parallel to the first and second planes and perpendicular to the analytical axis, and the gap length direction that is both parallel to the first and second planes and parallel to the analytical axis. The gap height, gap width, and gap length directions are thus preferably mutually orthogonal.

In theory, any number of segments are possible, but preferably the device includes 100 or fewer segments, more preferably 50 or fewer segments, more preferably 20 or fewer segments, more preferably 5-15 segments. At least 5 segments is preferred, but higher numbers enable higher values of focussing strength (e.g. as parameterised by the ratio R2/R1, discussed below).

The propelling means may be a gas supply configured to provide a flow of gas for propelling ions through the analytical gap in a direction parallel to the analytical axis of the device.

The propelling means may be a power supply configured to apply a voltage waveform to one or more electrodes of the device (which may include, for example segmentation of the first and second planar electrodes) in the second direction of w, to provide an electric field for propelling ions through the analytical gap in a direction parallel to the analytical axis of the device.

A second aspect of the invention provides:

A device for performing field asymmetric waveform ion mobility spectrometry, "FAIMS", the device comprising:

a first segmented planar electrode including three or more segments, wherein the segments of the first segmented planar electrode are arranged in a first plane and extend in a direction parallel to an analytical axis of the device;

a second segmented planar electrode including three or more segments, wherein the segments of the second segmented planar electrode are arranged in a second plane and extend in a direction parallel to the analytical axis of the device, wherein the first segmented planar electrode and the second segmented electrode are separated from each other to provide an analytical gap therebetween;

propelling means for propelling ions through the analytical gap in a direction parallel to the analytical axis of the device; and a power supply;

wherein the device is configured to operate in a FAIMS mode in which the power supply applies a set of voltage waveforms to the segments of the first and second segmented planar electrodes so as to produce an asymmetric time dependent electric field in the analytical gap for FAIMS analysis of ions propelled through the analytical gap by the propelling means;

wherein the set of voltage waveforms are configured such that the asymmetric time dependent electric field has curved contours of equal field strength when viewed in a plane perpendicular to the analytical axis so as to focus ions having different differential mobilities towards different spatial domains, wherein each spatial domain extending along a respective curved contour of equal field strength when viewed in a plane perpendicular to the analytical axis;

wherein the device has a focus controller configured to allow a user to change the curvature of the contours of equal field strength so as to change the strength of focussing provided by the asymmetric time dependent electric field.

In this way, the strength of focussing (or "focussing strength") provided by the asymmetric time dependent electric field can be controlled by a user to trade off the proportion of ions transmitted by the device versus the resolving power provided by the device. As in all prior art devices the higher the proportion of ions transmitted by the device, the lower the resolving power, and vice versa.

A skilled person would appreciated from the disclosure herein that each contour of equal field strength would connect positions of equal field strength, but that different contours would represent different field strengths.

Herein, "strength of focussing" (or "focusing strength") can be understood as representing the degree to which ion losses that occur in FAIMS separation may be reduced or prevented. These losses may be due to 1) diffusion and 2) space charge repulsion. The focusing preferably acts in the direction of the analytical gap g. The focusing is particularly useful in LP-FAIMS as diffusion increases as $1/\sqrt{P}$ (at constant temperature) and is proportion to the mobility, k. This is because higher focussing strength results in the ions focused into tighter domains. A device with focusing capability results in higher transmission than a device with no focusing capability. A device with a variable focusing capabilities allows the transmission to be optimised for a given requirement for resolving power of the FAIMS separation. As some FAIMS applications require only modest resolving power the variable focusing capability allows for higher transmission.

Herein, "differential mobility" can be understood as the difference in mobility k of an ion between two different applied E/N values. In the FAIMS mode of the device there will in general be two E/N values during the asymmetric time dependent waveform, (1) the value E/N prevailing during the high field voltage portion of the asymmetric time dependent waveform ($E_D$/N) and the (2) value E/N prevailing during low field voltage portion. In DMS the value of $E_D$/N should be sufficiently high so the K(E/N) has non-linear dependence. Thus, the difference K(E/N) if the basis of selection or separation in the DMS.

For avoidance of any doubt, the FAIMS mode need not be the only operating mode of the device.

Preferably, the curved contours of equal field strength correspond to an electric field produced in a space between two coaxial cylindrical electrodes, wherein the external radius of the inner cylindrical electrode is R1 and the internal radius of the outer cylindrical electrode is R2.

Such a field may be referred to as a "cylindrical field" herein. Such a field may be produced by applying appropriately scaled asymmetric RF & DC voltages to the segments of the first and second segmented planar electrodes segments. In some embodiments there may be third and fourth segmented planar electrodes as described below, e.g. so as to form an enclosed rectangular region. Any cylindrical field has an associated R2/R1 value. It should be understood that R1 and R2 refers to electrodes that would create an electrical field equivalent, i.e. mathematically indistinguishable from the electrical field created (recreated) with the analytical gap of the FAIMS device. To be clear the ratio of R2/R1 determines directly the strength of focussing. For the above described arrangement of two coaxial cylindrical electrodes, the variation of the electrical field across the gap is E1/E2=R2/R1, where E1 is the electrical field at the inner cylindrical electrode and E2 is the electrical field and the outer cylindrical electrode (noting that in reference to the segmented planar FAIMS device the inner and outer cylindrical electrodes are virtual). The absolute values of R1 and R2 are not important in respects of the focusing strength and only influence the scale of the device, the current invention applies to any practical scale.

Preferably, the focus controller is configured to allow a user to change the ratio R2/R1 of the cylindrical electrical field in the analytical gap of the FAIMS device, e.g. via software.

Preferably, the first and second segmented planar electrodes are arranged on opposite sides of the analytical gap.

Preferably, the device further comprises:
a third segmented planar electrode including two or more segments, wherein the segments of the third segmented planar electrode are arranged in a third plane and extend in a direction parallel to an analytical axis of the device;
a fourth segmented planar electrode including two or more segments, wherein the segments of the fourth segmented planar electrode are arranged in a fourth plane and extend in a direction parallel to an analytical axis of the device;
wherein the first and second segmented planar electrodes are arranged on opposite sides of the analytical gap and are separated from each other in a gap width direction that is perpendicular to the analytical axis;
wherein the third and fourth segmented electrodes are arranged on opposite sides of the analytical gap and are separated from each other in a gap height direction that is perpendicular to the analytical axis and the gap width direction.

The use of third and fourth segmented planar electrodes is one convenient way to provide a cylindrical field, particularly in a device in which w<~8 g, though a cylindrical field could also be achieved with just two segmented planar electrodes, e.g. that are adequately long, e.g. a device in which w>8 g The first and second planes may be parallel to each other. The third and fourth planes may be parallel to each other.

Preferably, the device comprises a gas controller for controlling the gas pressure in the analytical gap, and optionally a chamber in which the segmented planar electrodes of the FAIMS device are located.

Preferably, the gas controller is configured to maintain the gas pressure constant at a desired pressure.

Preferably, the gas controller is configured to provide, in the FAIMS mode, a gas pressure in the analytical gap that is: 1-200 mbar, more preferably 5-100 mbar, more preferably 5-50 mbar.

The device may include a barrier having an exit slit, wherein the barrier is located on the analytical axis such that the propelling means propels ions towards the barrier, wherein the barrier is configured to prevent ions from reaching a detector of the device unless they pass through the exit slit. For avoidance of any doubt, the barrier and exit slit may be located beyond the analytical gap, i.e. e.g. beyond the extent of the electrode planes in a gap length direction, optionally beyond any clamping electrodes (if present).

The barrier could be a physical barrier, or an electrical barrier (e.g. provided by from two or more Bradbury Nielsen gates, which are well known in the art).

The exit slit may have a width (in the gap height direction) of $w_{slit}$.

The barrier may be configured to be removed (e.g. if/when the device is to be used in a transparent mode, e.g. if the device is configured in accordance with the first aspect of the invention). If the barrier is a physical barrier, this could be achieved, for example, by the apparatus being configured to allow the barrier to be physically removed, e.g. using a motor (e.g. a linear motor) or the like. If the barrier is an electrical barrier, this could be achieved, for example, by configuring the electrical barrier to be turned off.

The device may be configured to permit adjustment of the width of the exit slit provided by the barrier. If the barrier is a physical barrier, this could be achieved, for example, by the apparatus being provided with a number of barriers having exits slits of different widths that can be used interchangeably. If the barrier is an electrical barrier, this could be achieved, for example, by configuring the electrical barrier to permit the width of the exit slit provided by the electrical barrier to be adjusted (e.g. by supplying different voltages to the electrical barrier, which could be provided by two or more Bradbury Nielsen gates, for example).

In this aspect of the invention, the(/each) exit slit preferably has a curvature which corresponds to the curvature of a curved contour of equal field strength of the asymmetric time dependent electric field when viewed in a plane perpendicular to the analytical axis.

The device may be configured to permit adjustment of the curvature of the exit slit provided by the barrier. If the barrier is a physical barrier, this could be achieved, for example, by the apparatus being provided with a number of barriers having exits slits of different curvature that can be used interchangeably. If the barrier is an electrical barrier, this could be achieved, for example, by configuring the electrical barrier to permit the curvature of the exit slit provided by the electrical barrier to be adjusted (e.g. by supplying different voltages to the electrical barrier, which could be provided by two or more Bradbury Nielsen gates, for example).

The apparatus may be configured to permit adjustment of the curvature of the exit slit provided by the barrier to a curvature that corresponds to the curvature of a curved contour of equal field strength of the asymmetric time dependent electric field when viewed in a plane perpendicular to the analytical axis, after the curvature has been changed using the focus controller.

For avoidance of any doubt, the focus controller may be implemented in software or hardware.

The device of this aspect of the invention may have any feature or combination of features described in connection with the first aspect of the invention.

Preferably, the power supply is configured to, when the device is operating in the FAIMS mode, apply a respective voltage waveform from the set of voltage waveforms to each segment of the first and second segmented planar electrodes so as to produce the asymmetric time dependent electric field in the analytical gap.

Preferably, the power supply includes two power supply units configured to, when the device is operating in the FAIMS mode, apply a respective voltage waveform from the set of voltage waveforms to each segment of the first and second segmented planar electrodes so as to produce the asymmetric time dependent electric field in the analytical gap.

Here, a first one of the power supply units may be configured to supply dispersion voltages (e.g. designated below as $V_D/2$ and $-V_D/2$) and a second one of the power supply units may be configured to supply focusing voltages (e.g. designated below as $V_{fp}$ and $V_{fn}$), wherein the device includes one or more capacitive voltage dividers so that different voltages are applied to different segments (e.g. as needed for a particular geometry). In this way, it is possible to provide the necessary voltage waveforms efficiently. An example is discussed below with reference to FIG. 3A.

The power supply may be configured to apply a set of additional DC voltages, referred to as the compensation voltages ("CVs", or just "CV"), to all the segments at the same time as the first and second sets of voltage waveforms.

The CVs may have predetermined values configured to cause ions having a predetermined differential mobility to exit via an exit slit (e.g. as referred to above).

The device may be configured to scan the CVs to cause ions having different predetermined differential mobilities to exit via the exit slit at different times, e.g. so as to provide a differential ion mobility spectrum.

If the power supply is configured to apply CVs to all segments at the same time as the set of voltage waveforms to the segments of the first and second planar electrodes, an electric field produced by applying the CVs to all segments preferably provides a field that has substantially the same form as that produced by applying the set of voltage waveforms to the segments of the first and second segmented planar electrodes.

In any aspect of the invention, the device may include a detector configured to detect ions which have passed through the analytical gap in a direction parallel to the analytical axis of the device.

A third aspect of the invention provides:

A device for performing field asymmetric waveform ion mobility spectrometry, "FAIMS", the device comprising:

a first segmented planar electrode including three or more segments, wherein the segments of the first segmented planar electrode are arranged in a first plane and extend in a direction parallel to an analytical axis of the device;

a second segmented planar electrode including three or more segments, wherein the segments of the second segmented planar electrode are arranged in a second plane and extend in a direction parallel to the analytical axis of the device, wherein the first segmented planar electrode and the second segmented electrode are separated from each other to provide an analytical gap therebetween;

propelling means for propelling ions through the analytical gap in a direction parallel to the analytical axis of the device; and a power supply;

wherein the device is configured to operate in a FAIMS mode in which the power supply applies a first set of voltage waveforms to the segments of the first and second segmented planar electrodes so as to produce an asymmetric time dependent electric field in the analytical gap for FAIMS analysis of ions propelled through the analytical gap by the propelling means;

wherein the set of voltage waveforms are configured such that the asymmetric time dependent electric field has substantially straight contours of equal field strength when viewed in a plane perpendicular to the analytical axis so as to focus ions having different differential mobilities towards different spatial domains, wherein each spatial domain extending along a respective linear contour of equal field strength when viewed in a plane perpendicular to the analytical axis.

In this way, the inventors have found it is possible to have high transmission concurrently with high resolving power, when the device includes a barrier as described below.

Preferably, the device has a focus controller configured to allow a user to change the gradient of the contours of equal field strength (e.g. as calculated at a predetermined location in the analytical gap) so as to change the strength of focussing provided by the asymmetric time dependent electric field (e.g. as calculated at the predetermined location). Note: in general, changing the gradient of the contours of equal field strength at one location in the analytical gap would result in the gradient of the contours of equal field strength being similarly changed at other locations in the analytic gap.

In this way, when the device includes a barrier as described below, the strength of focussing (or "focussing strength") provided by the asymmetric time dependent electric field can be controlled by a user without needing to trade off the proportion of ions transmitted by the device versus the resolving power provided by the device. In general, the higher the proportion of ions transmitted by the device, the lower the resolving power, and vice versa.

At a given location in the analytical gap, the gradient of the contours of equal field strength may be approximated to be differential of the electric field with respect to distance in the gap height direction. This corresponds to a difference between electric field strength at two closest points on two contours of equal field strength, divided by distance between those points in the gap height direction.

The device may include a barrier having an exit slit, wherein the barrier is located on the analytical axis such that the propelling means propels ions towards the barrier, wherein the barrier is configured to prevent ions from reaching a detector of the device unless they pass through the exit slit. For avoidance of any doubt, the barrier and exit slit may be located beyond the analytical gap, i.e. e.g. beyond the extent of the electrode planes in a gap length direction, optionally beyond any clamping electrodes (if present).

The barrier could be a physical barrier, or an electrical barrier (e.g. provided by from two or more Bradbury Nielsen gates, which are well known in the art).

The exit slit may have a width (in the gap height direction) of $w_{slit}$.

The barrier may be configured to be removed (e.g. if/when the device is to be used in a transparent mode, e.g. if the device is configured in accordance with the first aspect of the invention). If the barrier is a physical barrier, this could be achieved, for example, by the apparatus being configured to allow the barrier to be physically removed, e.g. using a motor (e.g. a linear motor) or the like. If the barrier is an electrical barrier, this could be achieved, for example, by configuring the electrical barrier to be turned off.

The device may be configured to permit adjustment of the width of the exit slit provided by the barrier. If the barrier is a physical barrier, this could be achieved, for example, by the apparatus being provided with a number of barriers having exits slits of different widths that can be used interchangeably. If the barrier is an electrical barrier, this could be achieved, for example, by configuring the electrical barrier to permit the width of the exit slit provided by the electrical barrier to be adjusted (e.g. by supplying different voltages to the electrical barrier, which could be provided by two or more Bradbury Nielsen gates, for example).

In this aspect of the invention, the(/each) exit slit preferably is linear and extends in a direction which corresponds to a linear contour of equal field strength of the asymmetric time dependent electric field when viewed in a plane perpendicular to the analytical axis.

A segmented planar FAIMS device configured such that the asymmetric time dependent electric field has substantially straight contours of equal field strength when viewed in a plane perpendicular to the analytical axis straight combined with a linear exit slit removes the trade-off between resolving power and transmission that has been suffered hitherto by all FAIMS and DMS devices. Thus, higher resolving power can be achieved together with high transmission. The highest resolving power may be achieved at the highest focusing strength.

Furthermore, the substantially straight contours of equal field strength means that the slit shape is independent of the focusing strength.

The substantially straight contours of equal field strength are preferably substantially straight over a significant distance, e.g. over a distance of w/4 or more. A skilled person would appreciate that it is difficult to achieve perfectly straight contours of equal field strength.

The power supply may be configured to apply a set of additional DC voltages, referred to as the compensation voltages ("CVs", or just "CV"), to all the segments at the same time as the first and second sets of voltage waveforms.

The CVs may have predetermined values configured to cause ions having a predetermined differential mobility to exit via an exit slit (e.g. as referred to above).

The device may be configured to scan the CVs to cause ions having different predetermined differential mobilities to exit via the exit slit at different times, e.g. so as to provide a differential ion mobility spectrum.

If the power supply is configured to apply CVs to all segments at the same time as the set of voltage waveforms to the segments of the first and second planar electrodes, an electric field produced by applying the CVs to all segments preferably provides a field that has substantially the same form as that produced by applying the set of voltage waveforms to the segments of the first and second segmented planar electrodes.

The height of the analytical gap in the gap height direction may be referred to herein as the gap height, or simply 'g'.

The ratio of gap width to gap height (w/g) may be in the range 2 to 6, more preferably in the range 3 to 5, more preferably in the range 3.5 to 4.5, and may be ~4. This restriction may be preferred if the device includes third and fourth segmented planar electrodes (as discussed elsewhere), but this preference does not apply if third and fourth segmented planar electrodes are included in the device.

The device of this aspect of the invention may have any feature or combination of features described in connection with the first aspect of the invention.

The device of this aspect of the invention may have any feature or combination of features described in connection with the second aspect of the invention.

Further aspects of the invention provide an analytical device including:
- a device for performing FAIMS according to any previous aspect of the invention;
- a device for performing mass spectrometry;
- wherein the device for performing mass spectrometry is configured to analyse ions that have passed through the analytical gap of the FAIMS device (in which case the analytical device may be termed a "FAIMS/MS device"), or the device for performing FAIMS is configured to analyse ions that have been selected by the device for performing mass spectrometry (in which case the analytical device may be termed an "MS/FAIMS device").

Further aspects of the invention may provide a method of operating a device for performing FAIMS according to any previous aspect of the invention.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIGS. 3A-C show a FAIMS PSU for use to operate the FAIMS device of FIGS. 2A-C in FAIMS and transparent modes using exemplary voltage division.

FIGS. 8A(i)-B(iii) respectively illustrate the FAIMS device of FIGS. 6A-B operating in a separation mode with focussing being provided by a cylindrical field and in a separation mode with focussing being provided by a near-linear field.

DETAILED DESCRIPTION OF THE INVENTION

Figure 1:
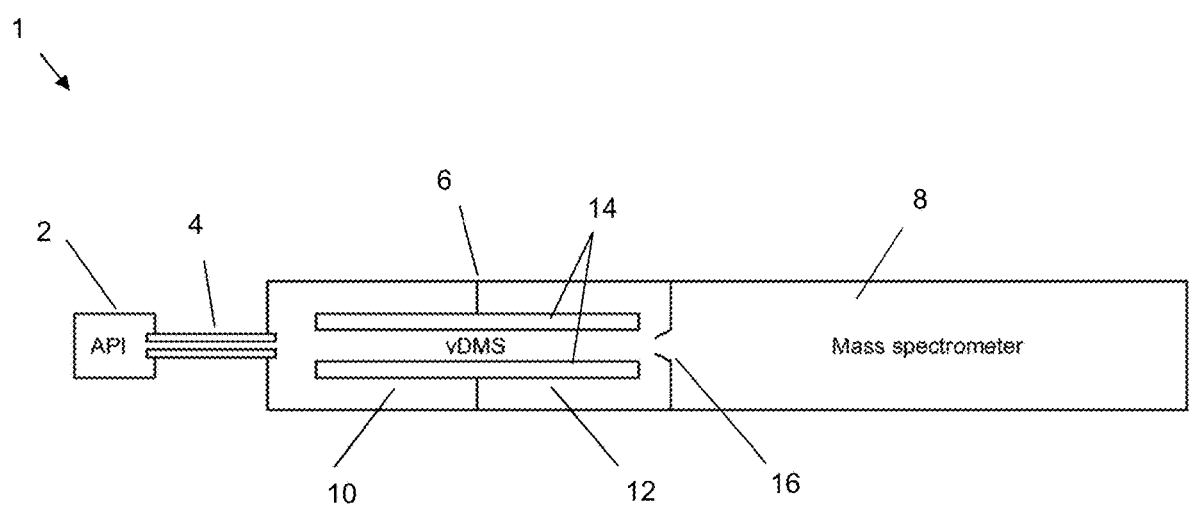
FIG. 1 shows a FAIMS/MS device incorporating an example LP-FAIMS device.

Aspects and embodiments of the present invention will now be discussed with reference to the accompanying figures. Further aspects and embodiments will be apparent to those skilled in the art. All documents mentioned in this text are incorporated herein by reference.

In general terms, the present disclosure relates to possible constructions of differential ion mobility spectrometers and their possible use with mass spectrometers. A particular use relates to improvements in the operation of low pressure DMS devices.

In general terms, the following examples can be viewed as building on the teaching of [1] and help to provide a FAIMS device that has segmented planar electrodes as well as improved separation and transparent modes.

Context

In devising the present invention, the present inventors constructed a prototype low-pressure FAIMS (LP-FAIMS) device as described in [1], using both the multipole configuration (having form of electrodes 26 in FIG. 2 of [1]), and (non-segmented) planar configuration (having form of electrodes 20 in FIG. 2 of [1]) disclosed therein. The low pressure allowed a substantially widening of the analytical gap ("FAIMS gap") and reduction of the waveform frequency and peak amplitude (dispersion voltage, "DV"). The lower frequency and lower peak amplitude DV permitted producing DV waveforms by a digital switching technology, in particular, it permitted producing near-rectangular DV waveforms with widely variable frequency and duty cycle d (which in accordance with the definition given above, can be expressed as an f-value, where $f=(1-d)/d$).

The DV and compensation voltages ("CVs") in FAIMS are preferably expressed as the dispersion field ($E_D$) and compensation field ($E_C$) to adjust for the gap width. In LP-FAIMS, those quantities are preferably converted to the reduced fields by dividing the electric field by the gas number density N (number of molecules per unit volume) to provide $E_D/N$ and $E_C/N$, which helps to remove the dependence of separations on the gas pressure (except for macromolecules exhibiting electric dipole alignment), and reduce the dependence of separations on temperature. The low pressure permits higher $E_D/N$ values (commonly limited by electrical breakdown in gas), taking separations deeper into the non-linear IMS region. This improves the resolving power, offsetting the peak broadening due to increased diffusion (the isotropic diffusion coefficient scales as $P^{-1/2}$). The inventors found that the planar-gap configuration can provide higher resolving power than the multipole geometry.

It has been suggested in the art that setting the electrodes to different temperatures to create a constant gradient of temperature (and thus of N and E/N) across the analytical gap and will focus ions undergoing FAIMS analysis in the gap, see e.g. [12]. As is known in the art of ambient-pressure FAIMS, such a gradient focuses ions with appropriate forms of K(E/N) (ion mobility K expressed as a function of E/N) to the gap median (gap median=halfway along the gap in the gap height direction).

The inventors have implemented a constant gradient of temperature in the context of the present invention, i.e. planar LP-FAIMS. Here, the inventors found that imposing a thermal gradient allowed raising the maximum resolving power beyond that in an equivalent planar-gap device lacking the thermal gradient. The optimum performance required adjusting the gas pressure in LP-FAIMS chamber, while keeping the pressure in downstream chambers constant. The inventors also found imposing a thermal gradient also provided increased ion transmission) by reducing losses of ions on electrodes due to diffusion and space-charge expansion. The signal gain may be high, typically 4 times, but this gain in transmission was gained at with the loss of some resolution of the FAIMS separation.

To that end, the means to rapidly change and stabilize the pressure in LP-FAIMS without affecting the pressures in downstream chambers were devised.

The present inventors are not aware of others implementing a constant gradient of temperature in a planar FAIMS device.

By our market analysis, maturing FAIMS/MS technology to broader acceptance hinges on maximizing ion transmission through the FAIMS stage without separation (i.e., upon "switching FAIMS off" in the transparent mode). The repeated physical removal and re-installation of FAIMS device is not an acceptable solution, as that is time-consuming, requires trained personnel, disrupts the workflow, generally requires validation after each re-installation, and would stress parts of both units. The capability for automatic acquisition combining the FAIMS-on and FAIMS-off modes (in either pre-programmed or data-dependent manner) is also desired. Thus, FAIMS should be engineered as an integral part of the instrumentation. Market analysis has also identified the inability to achieve high resolution and high sensitivity simultaneously as another problem. For example, while FAIMS can remove chemical noise to improve the limit of detection ("LoD") for species of certain chemical classes such as tryptic peptides, the overall ion losses constrain the LoD gains.

While the planar-gap LP-FAIMS geometry of [1] has provided better resolution than the multipole as stated above, the present inventors found it did not effectively transmit ions with FAIMS off. Overcoming that limitation was one motivation for the present invention.

In other words, one problem to be solved is providing a "transparent" mode that effectively transmits all ions without discrimination or selection by differential mobility, while allowing rapid switching between that and the FAIMS separation mode with no mechanical adjustments (noting that this problem needs to be overcome in a planar format, not in a square format as taught e.g. in [13]).

A known approach to ion focusing in planar FAIMS gaps is heating one electrode above the other to establish a thermal gradient across the gap. The thermal gradient focuses ions by counteracting ion diffusion and space charge. This focussing technique is associated with multiple major problems, including four inherent to the approach: (1) the focusing operates only in conjunction with FAIMS separation, precluding the desired FAIMS switch-off (there is no means for focusing ions in a transparent mode); (2) the focusing strength strongly depends on the K(E/N) properties of specific ions, with some species focused poorly or actively defocused; (3) heating the gas couples focusing to the intrinsic temperature dependence of mobility with unpredictable outcomes; and (4) heating may cause dissociation or isomerization of ions. The other two issues are practical: (5) heating or cooling of electrodes takes too long for rapid switching of focusing or tuning its strength, precluding use in data-dependent acquisition and many other modes, and (6) the thermal gradient is capped by heat transfer across the gap, which limits the maximum focusing strength. While these can partially be addressed by further engineering, the cost and complexity would be very substantial. This situation motivated the present inventors to find a way to achieve ion focusing in a FAIMS device without manipulation of the electrode temperatures.

In devising the present invention, the present inventors were seeking to achieve a FAIMS device, preferably a LP-FAIMS device with:

Two operational modes: the separation and 'transparent' mode

Improved ion transmission in the separation mode

Higher resolving power in separation mode

Readily adjustable resolution/sensitivity balance in the separation mode

Simultaneously improved resolving power and sensitivity the separation mode

With respect to prior art, FAIMS devices with a cylindrical gap (i.e. a gap between two cylindrical electrodes, see e.g. electrodes 22 in FIG. 2 of [1]) or a dome-shaped gap (i.e. a gap between two hemispherical domes) are known to provide higher transmission and lower resolution compared to planar-gap devices (having a gap between two planar electrodes, see e.g. electrodes 20 in FIG. 2 of [1]). This happens because the inhomogeneous (cylindrical) electric field in the annular gap between coaxial cylindrical electrodes focuses ions with appropriate $K(E/N)$ forms to a domain corresponding to the $K(E/N)$ value. The focusing strength grows with increasing gap curvature defined by the $R2/R1$ ratio, where $R1$ is the external radius of inner electrode and $R2$ is the internal radius of outer electrode.

Reference [2] teaches applying voltages to specific elements of planar FAIMS electrodes (with segments extending along the analytical axis, that is along the direction of ion travel through the gap) to form a substantially cylindrical electric field there between and varying those voltages to tune the curvature of mid-equipotential surface. However, the purpose of said tuning was not specified, and no means to achieve said tuning is disclosed. Further, the device taught in [2] provides no means to focus ions in the transparent mode. These problems are solved by the present disclosure.

1) First Aspect of the Invention

In the examples discussed below, this aspect of the invention can be viewed as providing a planar FAIMS device with improved transmission mode.

The present disclosure is concerned with planar-gap FAIMS, specifically at deeply sub-ambient gas pressures (LP-FAIMS). While we have investigated (in experiment and/or simulations) the pressure range of 5-100 mbar, that was limited by aspects of our current instrumentation and samples. A wider range of 1-200 mbar appears practical.

Preferred features of this aspect of the invention:

1. The electrodes are split into at least three segments elongated along the direction of ion travel through the gap. The resulting device may hereafter be termed segmented planar FAIMS.

2. There are propelling means to propel ions through the gap.

3. The FAIMS power supply unit (PSU) has means to switch between a symmetric waveform (with 50% duty cycle, for a transparent mode) and an asymmetric waveform (with other than a 50% duty cycle, for a FAIMS mode (any required value))

4. There are means to switch between two electric field configurations, for example: (a) a substantially dipole field for FAIMS separation and (b) a substantially quadrupolar field for ion confinement (transparent mode). Various transparent modes are possible, as described herein (see e.g. FIGS. 3B, 3C and 11A-D discussed herein).

5. The FAIMS PSU has means to switch between two substantially different RF frequencies (e.g. since optimum values for FAIMS separation and ion confinement in the transparent mode substantially differ)

6 There are means to switch the pressure between two stable values (e.g. since the optimum pressure for FAIMS separation often exceeds that for optimum ion transmission in the transparent mode).

In the transparent mode, ions may be transmitted through the gap without deliberate selection or discrimination based on absolute or differential mobility and with minimal losses due to diffusion and Coulomb expansion. In the examples discussed below, a quadrupolar field confines ions to the gap median to increase the efficiency of their transfer through subsequent apertures to the downstream stages.

Experimentally, the multipole device of [1] provided lower FAIMS resolving power than the planar-gap device, and did not provide effective means to tune the ion focusing strength. According to [1], ions are moved along the gap by a gas flow created by various means or by an electric field. Similar methods may be applied to the present disclosure. A FAIMS device with varying focusing strength would be useful for many applications. For example, high sensitivity is important when removing chemical interferences to improve the limits of detection (sensitivity) in MS or reducing the multiplicity of charge states of protein ions. A higher resolving power is crucial to disentangle structural isomers (for example, of lipids or peptides) when sufficient sample is available.

The present invention eliminates the need for physical removal of LP-FAIMS device from a mass spectrometer or other instrument to recover its original performance by increasing the ion transmission through the FAIMS stage to 100% in a transparent mode. The present invention may be applied to an LP-FAIMS device with segmented planar electrodes and preferably operates at sub-ambient pressure, more preferably in the range of 1-200 mbar and most preferably 5-50 mbar. The gas composition may maybe 100% nitrogen a mixture of Helium and Nitrogen. The inventors have found that Helium and Nitrogen mixtures can significantly increase resolving power and transmission compared to 100% Nitrogen in the context of LP FAIMS. Other gas compositions can also be used for example $CO_2$ and hydrogen, not limiting.

2) Second Aspect of the Invention

In the examples discussed below, this aspect of the invention can be viewed as providing a practical planar FAIMS device with variable focusing strength, improved transmission and improved resolving power.

Two types of FAIMS device geometries are known in the art, with (i) curved (particularly cylindrical) gap established using coaxial cylindrical and/or concentric spherical electrodes and (ii) planar gap established using parallel planar electrodes. The planar-gap FAIMS has been found to provide highest resolution at the cost of ion transmission (sensitivity). A key metric of cylindrical FAIMS that controls the focusing strength is the gap curvature, defined as above. The FAIMS pro (a current product by Thermo)

employs R2/R1=1.2 for strong focusing and thus near-maximum ion transmission. Other commercial FAIMS and FAIMS-MS systems, in particular Lonestar FAIMS (Owlstone) and Selexlon FAIMS/MS (by Sciex) derived from the stand-alone system (by legacy Sionex), employ planar-gap devices.

All these FAIMS devices operate at ambient pressure. The Selexlon system has short ion residence times to limit the ion losses, but still provides higher resolution than the FAIMS pro. The upper limits of resolving power achieved so far by planar ambient-pressure FAIMS are ~150 for singly-charged and ~400 for multiply-charged species [6], but with very limited ion transmission/sensitivity.

Reference [1] taught methods for operating FAIMS at lower gas pressures, i.e. "LP-FAIMS". Subsequently LP-FAIMS was demonstrated with the planar and multipole geometry cells coupled to the quadrupole or time-of-flight mass spectrometry (e.g. [7]). Exemplary separations using the planar-gap unit included those of nominally isobaric amino acids (representative of small-molecule applications) and PTM localization variants of singly and doubly phosphorylated peptides from the human τ-protein (representative of frontline proteomic and epigenetic analyses). The resolution generally compared to or exceeded that of commercial ambient-pressure FAIMS systems configured for reasonable ion transmission, although fell short of that for high-resolution FAIMS. However, the ion residence time in these studies was ~10 ms compared to ~100-500 ms for high-resolution FAIMS. The short filtering time is useful as it allows for the nesting of FAIMS scans within reasonable peak elution times in preceding liquid chromatography (LC) or capillary electrophoresis (CE) separations.

As explained above, the electric fields in LP-FAIMS are preferably expressed in invariant E/N terms with units of Townsend (Td). The dependence of $E_C/N$ on $E_D/N$ measured in LP-FAIMS and K(E/N) functions derived therefrom were properly independent of the pressure and electric field strength alone.

The ability to access the highly nonlinear K(E/N) regions at low pressure provided additional flexibility of separations and higher resolution.

As also stated above, digital switching, which is made practicable by operating a FAIMS device at low pressure, and enables generating near-rectangular waveforms with widely variable frequency and HF/LF ratio (denoted as f value), and changing the frequency and amplitude rapidly. (While the technology can be used at any pressure, the practical constraints of power consumption and dissipation limit it to low voltage and thus narrow gaps at ambient pressure, resulting in a low resolution.) Energy recovery digital PSU technology is preferred to reduce power consumption.

Focusing of ions in FAIMS using a thermal gradient was suggested for ambient-pressure planar FAIMS as described above, and has been demonstrated for LP-FAIMS in (unpublished) research by the present inventors. The present inventors have realized that the focusing regimes resulting from the variation of N (via local gas temperature T) or E differ. The former involves a constant E/N gradient, but the intrinsic K(T) dependence (dependent on the ion species and gas identity) superposed on it yields complex case-specific behaviours. The latter (in curved gaps) involves a non-constant E/N gradient, with E scaling as 1/R in cylindrical or $1/R^2$ in spherical gaps. Thus, the two approaches are inequivalent, and the effective gradient is nonlinear in both. As noted above, establishing an E/N gradient through thermal variation has multiple adverse inherent and practical aspects. A true linear E/N gradient may deliver substantial operational benefits, but could not be found in prior art known to the present inventors.

This aspect of the invention may be viewed as providing an essentially linear E/N gradient employing segmented planar electrodes. While this is possible at any gas pressure in principle, it is most amenable to LP-FAIMS as the physically larger electrodes facilitate the mechanical implementation while lower voltages and frequencies simplify the electrical engineering. Furthermore, transparent modes are not available at atmospheric pressure.

Preferred features of this aspect of the invention:
1. The operating pressure range is 1-200 mbar.
2. The LP-FAIMS device has two planar electrodes, each comprising at least 3 segments elongated along the direction of ion travel through the gap. The two electrodes may be separated by dielectric spacers.
3. There are means to propel ions through the gap.
4. The PSU is able to output at least four asymmetric waveforms.
5. There are at least two asymmetric waveforms with duty cycle of d and at least one with duty cycle of (1−d).
6. At least some of the four asymmetric waveforms and dc voltages supplied (to establish the CV values) to create a cylindrical electric field with adjustable focusing strength.
7. There are means to rapidly adjust and stabilize the pressure in LP-FAIMS cell.
8. There are means to determine the ion filtering time in FAIMS gap (this may be done by adjusting the device length or in jet driven flow by physically exchanging the gas shaping duct preceding the FAIMS device).

The present disclosure not only builds on [2], but in some aspects lie apart from the teaching of [2]. Specifically, [2] teaches applying voltages to create a cylindrical electric field with variable effective radius. However, the purpose and methods to achieve this were not conceived or taught in [2]. The present inventors have found that focusing strength is directly related to ratio of maximum to minimum field radius across the gap, R2/R1, with the absolute field radius not being important to the focusing strength.

A cylindrical electric field resulting from voltages on electrode segments is equivalent to that in a physically cylindrical gap. The focusing strength in segmented planar LP-FAIMS is tunable by varying the electrode voltages to yield the field with desired effective R2/R1 value, which value can be set independently of gap width (g). However, the focusing domain (spatial domain towards which ions having a given differential mobility are focused) in this case is an arc with curvature increasing for stronger focusing strength, that is higher $E_D/N$ gradient across the gap. Without that gradient, $E_C/N$ depends on $E_D/N$ as:

$$\frac{E_c}{N} := \frac{\alpha_1 \cdot F3 \cdot \left(\frac{E_D}{N}\right)^3 + \alpha_2 \cdot F5 \cdot \left(\frac{E_D}{N}\right)^5 + \alpha_3 \cdot F7 \cdot \left(\frac{E_D}{N}\right)^7}{\left[1 + 3\alpha_1 \cdot F2 \cdot \left(\frac{E_D}{N}\right)^2 + 5\alpha_2 \cdot F4 \cdot \left(\left(\frac{E_D}{N}\right)\right)^4 + 7\alpha_3 \cdot F6 \cdot \left(\left(\frac{E_D}{N}\right)\right)^6\right]} \quad (1)$$

where $\alpha_1$, $\alpha_2$, $\alpha_3$ are the "alpha coefficients" that describe the nonlinear mobility behaviour. The terms F2 to F7 depend on the waveform profile; by way of example, for the ideal rectangular waveform with an f—value of 4, they are respectively 0.25, 0.188, 0.203, 0.199, 0.200, and 0.200. With the field gradient (as in cylindrical FAIMS), the equation (1) is satisfied at a certain (equilibrium) radius. Ions displaced to lower or higher radii experience the restoring force to said radius, meaning a stable equilibrium. This focusing effect suppresses the (anisotropic longitudinal) diffusion in radial direction, where the separation occurs. In a planar gap with $E_D/N$ gradient resulting from voltages on electrode segments, the diffusion orthogonal to the curved $E_D/N$ isosurfaces will be suppressed. However, the (transverse) diffusion along those surfaces remains free, making the ion swarm increasingly curved as the separation progresses. Variation of applied CVs will scan the whole swarm across the gap, allowing ions to pass through the FAIMS device over a range of CV values. That will broaden the peaks in CV spectra, decreasing the resolution of separation as is known in the art with physically curved gaps.

For a sufficiently accurate cylindrical field in segmented planar FAIMS, the lateral electrode span (w) should exceed g (the width of the FAIMS gap) by about an order of magnitude. Then the fringe electric fields near electrode edges will not materially affect the fields near the device axis (in the area occupied by ions traveling along the gap).

A wide gap may introduce difficulties to produce required voltages, if a reasonable focusing strength is required.

The necessary w/g ratio may be reduced somewhat for fully enclosed gaps (e.g. with first, second, third and fourth segmented planar electrodes) with proper voltages applied to all electrodes. The segment widths can vary over the electrode span, increasing from the axis toward the edges.

3) Third Aspect of the Invention

In the examples discussed below, this aspect of the invention can be viewed as providing a planar FAIMS device with variable focusing strength and improved resolving power in combination with improved transmission.

In this aspect, the segment voltages may be adjusted to yield a near-linear gradient of E in a substantial volume surrounding the median of the gap and the axis of the gap, wherein the essentially planar isosurfaces of $E_D$ and thus $E_D/N$ are parallel to the electrodes and shift toward either depending on the applied CVs. The voltages needed for any electrode geometry may be found by numerical iteration. The methods for such calculations are standard and can be implemented by those versed in the art in view of the present disclosure. According to numerical calculations and modelling by the inventors, the optimum w/g ratio for examples in this aspect of the invention is ~4. The relaxation of the field for an open gap provides for sufficiently linear $E_D/N$ isosurfaces in the median region of the device. This is one example for conveniently creating a suitable linear field gradient, but other methods may be used.

In this way, ions are confined to planar layers around those surfaces and can spread out within such layers. However, the focused ion swarms will now be near-planar, and only a single layer with characteristic CV could pass the planar gap and exit the cell through a narrow aperture (preferably slit in the gap plane) to the downstream mass spectrometer or other instrument stage. This aperture should be shaped and places as not to perturb the FAIMS separation field and is preferably removable or adjustable to allow "transparent" mode. It may be used in conjunction with electrodes clamping (limiting the extent of) the fringe field, which may also be used to accelerate ions through the region of significant fringe field near the cell exit. Where ions are carried through the gap by gas flow, the slit should not materially affect the flow profile. The barrier in some embodiments may be formed from a wire electrodes operating as Bradbury Nielsen gates. Ions stopped by application of two phases of RF to the gate, and be allowed to pass through by removal of the RF. The effective width of the slit may also be made adjustable by control of the RF applied to the Bradbury Nielsen gates. This configuration has the advantage that the aperture does not need to be physically removed and may be turned on or off rapidly in a predetermined manner and does not significantly perturb a gas flow exiting the device.

The higher the focusing strength the thinner the slit should be.

Preferred features of this aspect of the invention include features 1-5, 7, and 8 discussed above in relation to the second aspect of the invention, plus:

9. At least some of the four asymmetric waveforms and dc voltages supplied (to establish the CV values) have independently variable amplitudes to create an electric field with substantially planar isosurfaces parallel to the planar electrodes. Note: this would not be a straightforward change, and would require a change in the manner in which voltages are divided between the segments in order to attain the linear field gradient. It is doubtful such a change could be achieved merely by changing the 4 voltages.

10. The device may include a barrier having an exit slit, wherein the barrier is located on the analytical axis such that the propelling means propels ions towards the barrier, wherein the barrier is configured to prevent ions from exiting the analytical gap unless they pass through the exit slit.

This aspect of the invention is relevant to FAIMS with any mechanism for propelling ions through the gap, including the flow driven, longitudinal field drive, or jet drive, all these methods are described in [1]. The ion focusing in FAIMS allows to be used in combination with extended the filtering time (i.e. by making a longer device) without the normally concomitant ion losses upon beam broadening caused by diffusion or Coulomb repulsion, which enables improving resolution with less steep ion losses.

When a barrier with a slit is employed in combination with strong focusing the invention gives rise to good transmission in combination with high resolving power and short filtering time.

DETAILED EXAMPLES

1) Relating to First Aspect of the Invention

FIG. 1 shows a FAIMS/MS device 1 incorporating an example LP-FAIMS device 14.

Referring to FIG. 1, a chamber 6 comprising the LP-FAIMS device 14 lies between an atmospheric-pressure ionization (API) ion source, which in this example is an electrospray ionization (ESI) source 2 and MS stage 8. As is known in the art, the sample in suitable solvent is delivered to 2 that creates a plume of charged droplets. At least some of said droplets and ions liberated therefrom pass into the desolvation tube (capillary) 4, where those droplets evaporate and release ions. Said ions are entrained in a supersonic gas jet exiting 4 into the chamber 6 kept at a pressure of 1-100 mbar. The chamber 6 contains the means to slow said jet down (disclosed in [1]). The device 14 transmits to the skimmer 16 either all ion species or a subset thereof with selected differential mobility values, with other species deflected toward the FAIMS electrodes and destroyed by neutralization upon landing on their surfaces.

Figure 2A:
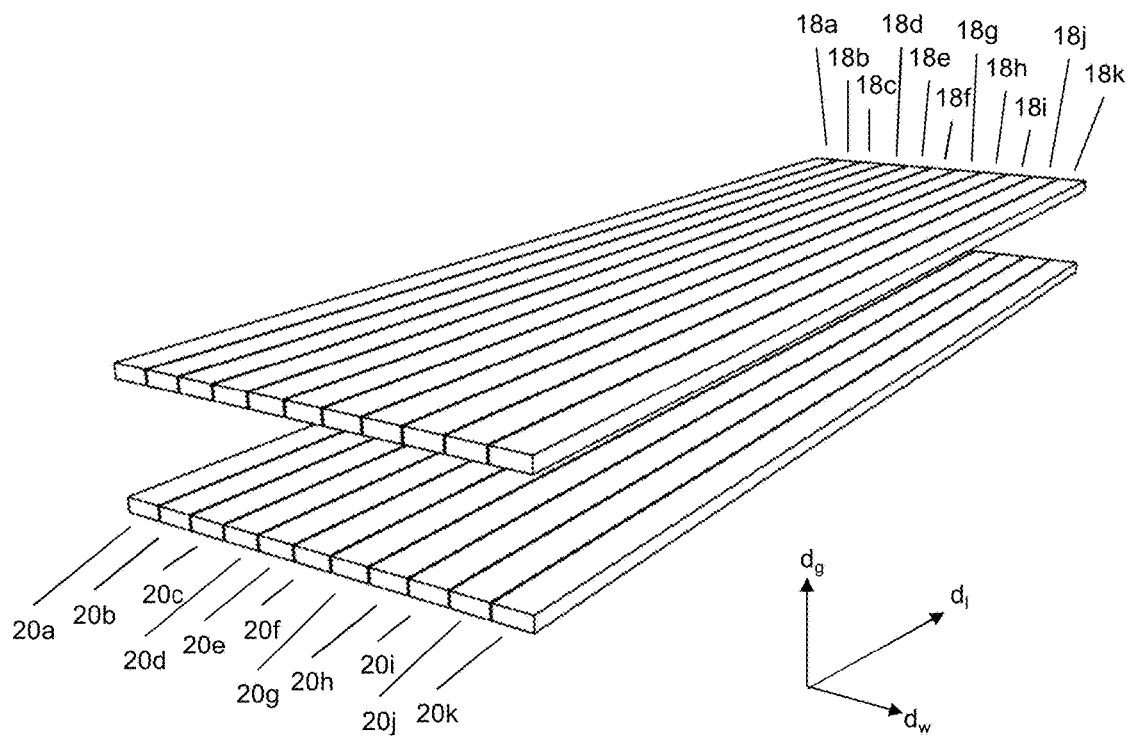
FIGS. 2A-C show an exemplary FAIMS device incorporating segmented planar electrodes.
Figure 2B:
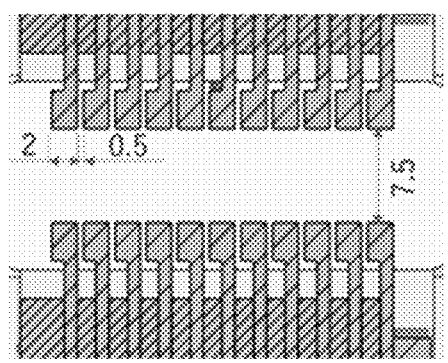
Figure 2C:
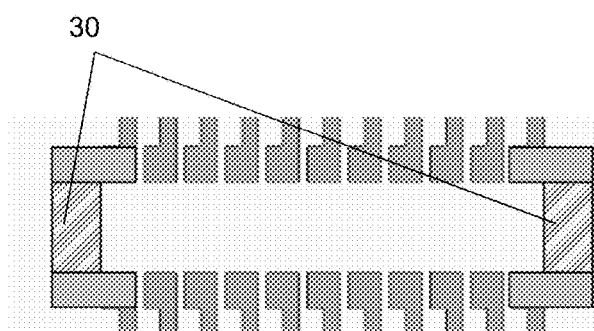

An exemplary segmented FAIMS device shown in FIG. 2A comprises two parallel planar electrodes, with the segments 18a to 18k in the top and 20a to 20k in the bottom electrodes. FIG. 2A also shows the gap height ($d_g$), gap width ($d_w$) and gap length ($d_l$) directions. Each electrode may comprise three or more segments (e.g. as many as one-hundred segments), with present depiction showing eleven segments. FIG. 2B presents the device cross section with exemplary dimensions of g=7.5 mm and w=30 mm (here w=4 g). The L-shaped segments with 2 mm lateral spans and 0.5 mm gaps there between are secured in a mounting, isolated by insulating spacers. The top and bottom electrodes are spaced by two insulating spacers 30 that define the g value, as shown in FIG. 2C.

Describing the voltages shown in FIG. 3A in more detail which are exemplified for a cylindrical (focusing) field, the voltages to all electrode segments in the two planes of segmented electrodes (in the example electrodes p1 to p11 and n1 to n11) may be provided by only two PSUs. The two PSU may then provide the required voltage to each electrode segments in said planes of electrodes. For each there is a PSU for supplying the dispersion voltage, detonated $V_D/2$ and $-V_D/2$ and focusing voltages $V_{fp}$ and $V_{fn}$, where subscript fp denotes positive focusing voltage and fn denotes negative focusing voltage. $V_D/2$ and $-V_D/2$, are applied to the central electrode in each plane denoted p6 and n6 and $V_{fp}$ is applied to the outermost electrodes, denoted p1 and p11 and similarly $V_{fn}$ is applied to outermost electrodes n1 and n11. The voltages for the other segments, p2, p3, p4, p5, p7, p8, p9, p10 may be provide by the capacitive division (as exemplified in FIG. 3A, using C1 to C5 and C6 to C10). The strength of focusing, value of R2/R1 is adjusted by changing the voltage ratios $V_{fp}/V_D$ and $V_{fn}/V_D$. The required voltages are defined in FIG. 3A in terms of the PSU voltages $V_D/2$ and $-V_D/2$, $V_{fp}$ and $V_{fn}$, but we should note these are example values apply only to a specific geometry. In general, the approach can be applied for any number of electrode segments. The values provided in FIG. 3A inform the values of C1 to C5 and C6 to C10 taking into account capacitors $C_b$ (DC blocking capacitors) and the capacitance between the adjacent electrodes. An engineer of ordinary skill could determine the required capacitor values, C1 to C5 and C6 to C10. To be clear voltages $V_D/2$ and $-V_D/2$, $V_{fp}$ and $V_{fn}$ are asymmetric RF voltages as described above. $C_b$ allows DC and RF voltage to be applied to each electrode. DC voltages should be applied to the electrode segments in the same relative ratios of as the RF voltages. Note that $V_D$ is the total dispersion voltage applied across the analytical gap, in this example a voltage of $+V_D/2$ is applied to the upper plane and $-V_D/2$ is applied to the lower plane, providing a total voltage across the analytical gap of $V_D$, We note that $V_{fp} \neq -V_{fn}$, $V_{fp} \geq +V_D/2$ and is always positive $V_{fn} \geq -V_D/2$, and may take positive or negative values. When no focusing is required R2/R1=1 and $V_{fp}$ is set $+V_D/2$ and $V_{fp}$ is set $-V_D/2$.

In this example, a transparent mode involves a quadrupole field confining ions to the FAIMS cell axis, provided by alternating voltage VT with typical d=0.5. Two exemplary electronic schemes for loading VT are shown in FIG. 3B and FIG. 3C (with alternate electrodes carrying opposite phases). FIG. 3B shows a substantially quadrupole field (for use in transmission mode), which is able to confine ions without the need for a DC voltage. FIG. 3c shows a linear multipole field (for use in transmission mode) which configured ions in a direction extending between the planes of the segmented electrodes, but an additional DC voltage would be required to confine ions in a lateral direction.

Figure 4A:
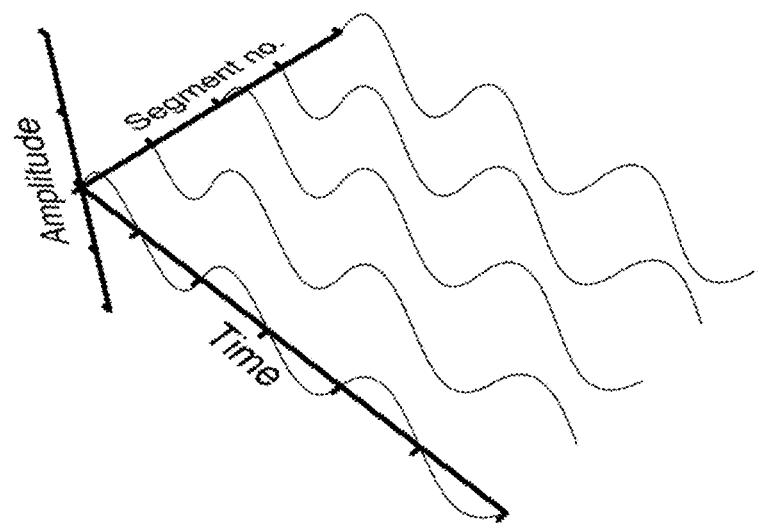
FIGS. 4A-B respectively shows the application of harmonic and rectangular form voltage waveforms for use in a transparent mode.
Figure 4B:
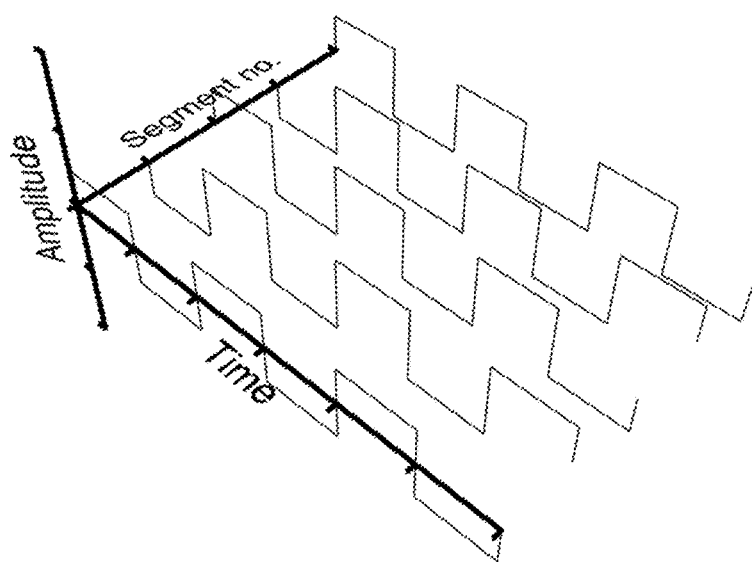

The PSU outputting V and VT and their negative counterparts preferably employs digital power supplies, readily enabling d<0.5 or d>0.5 as well. All schemes in FIGS. 3A-C preferably employ isolation switches or relays operated by a digital controller (not shown). Said controller is preferably configured to switch the device between planar FAIMS mode (with no ion focusing), gradient FAIMS mode (with adjustable focusing strength), and a transparent mode. The symmetric RF for transparent mode may have the usual harmonic profile e.g. as shown in FIG. 4A as well as the rectangular profile e.g. as shown in FIG. 4B. Either RF form works, but rectangular profile is thought to provide better confinement.

A digital PSU readily permits varying the waveform frequency and amplitude. The typical frequency in separation mode (for the device dimensions per FIG. 2B) is 25-500 kHz, depending largely on the mass and mobility of ions of interest—lower for heavy, less mobile species such as macromolecule (e.g. protein) ions and higher for light small ions. A commonly employed frequency is 200 kHz.

The optimum frequencies in transparent mode are preferably higher. To effectively confine ions at pressures up to at least 40 mbar ([8]) &[9]). The pertinent figure γ varying from 1 for perfect confinement to 0 for none, depends on the gas pressure and RF frequency [10]. Physically, the ion relaxation time must be close to or exceed the RF period. So, for a given pressure one can improve confinement by raising the frequency. However, raising the frequency also reduces the depth of Dehmelt pseudopotential. Said depth may be restored by proportionately increasing the RF voltage, up to the electrical breakdown limit. Exemplary regimes for the benchmark papaverine 1+ ion (reduced mobility $K_0$=1.04 cm$^2$/vs) at ambient gas temperature (300 K) are tabulated below, showing that different frequencies are required for improved confinement (transmission) in the transparent mode:

TABLE 1

Exemplary regimes for the benchmark papaverine 1 + ion (reduced mobility $K_0$ = 1.04 cm$^2$/vs) at ambient gas temperature (300 K)

| Ion | Pressure (mbar) | Relaxation time $\tau_p$ (ns) | Frequency (MHz) | γ |
|---|---|---|---|---|
| Papaverine ($K_o$ = 1.04 cm$^2$/vs) | 30 | 23 ns | 0.2 | 0.001 |
| | | | 1 | 0.027 |
| | | | 3 | 0.198 |
| | 5 | 158 ns | 0.2 | 0.038 |
| | | | 1 | 0.497 |
| | | | 3 | 0.899 |
| | 1 | 791 ns | 0.2 | 0.497 |
| | | | 1 | 0.961 |
| | | | 3 | 0.996 |

From this table, suitable pressures and frequencies required for good transmission of ions in transparent mode can be deduced, e.g. it can be deduced that 30 mbar and 200 kHz result in negligible confinement (γ=0.001 in a transparent mode). Changing the frequency (as can be done by the preferred digital supply) at same pressure up to 3 MHz produces a large increase in γ to 0.20. However, if pressure is concurrently reduced to for example to 5 mbar, this brings near-perfect confinement (γ=0.90). Alternatively, dropping the pressure to 1 mbar yields reasonable ion confinement (γ=0.50) at the original 0.2 MHz frequency. These teachings assist in deducing conditions for good transmission of ions in transparent mode of the LP-FAIMS device, for wide range of ions.

2) Relating to Second Aspect of the Invention

The equipotential surfaces and strength of cylindrical field in the annular gap between two coaxial cylindrical electrodes for any R1 and R2, where R1 is the external radius of inner electrode and R2 is the internal radius of outer electrode is well understood.

For example, we may define $\chi=R2/R1$. The equipotential surface is defined in terms of Cartesian coordinates x and y by:

$$V_C(x, y) := \frac{\ln(x^2 + y^2)}{2\ln(\chi)} \quad (2)$$

and the strength of cylindrical electrical field is defined by:

$$E_C(x, y) := \frac{1}{\sqrt{x^2 + y^2} \cdot \ln(\chi)} \quad (3)$$

Figure 5A:
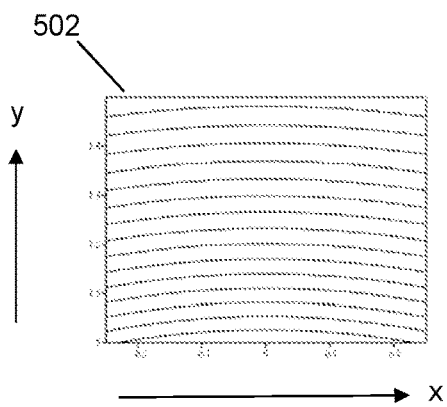
FIGS. 5A(i)-B illustrate the properties of a cylindrical electrical field.

FIGS. 5A(i)-(iv) show a cylindrical field 502, 504, 506, 508 for different values of $\chi$.

Figure 5B:
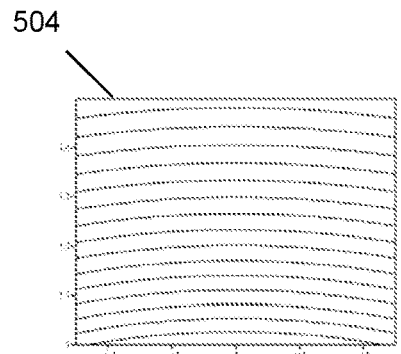
Figure 5B:
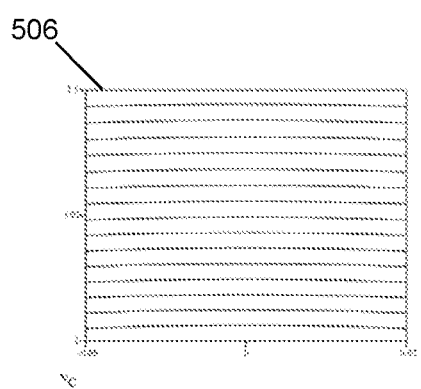
Figure 5B:
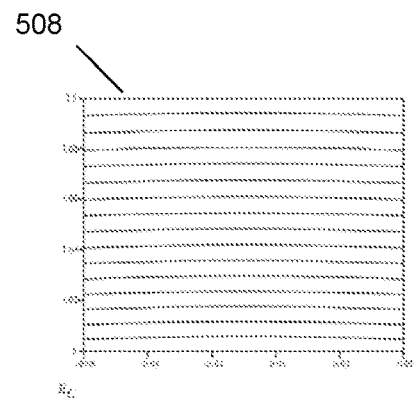
Figure 5B:
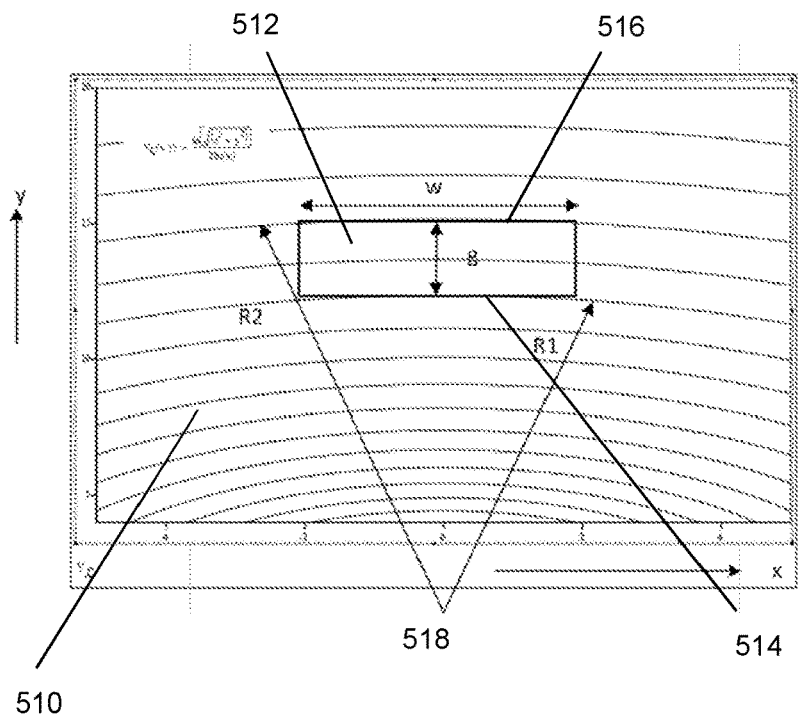

FIG. 5B shows a rectangular region 510 that could be positioned anywhere within a cylindrical field, where equipotential contours are defined with reference to the cartesian x, y coordinates. Each equipotential line has a curvature radius R with a common centre 518. Rectangular region 512 is chosen to have the same size and shape as the LP segmented FAIMS device with a chosen gap g and chosen width w located within rectangular region 510. Equipotential contour having radius R1 is tangential to inner face of the lower electrode plane 514 at its centre point. Equipotential contour having radius R2 is tangential to inner face of the upper electrode plane 516 at its centre point. The ratio of the E/N across the LP segmented FAIMS device is $(E/N_{lower})$ $(E/N_{upper})=\chi$.

Thus $\chi$ provides a direct measure of focusing and is independent of gap g. In other words, this shows that a cylindrical field with a chosen $\chi$ can be established within the rectangular region, regardless of g and w, by setting the voltages applied to the electrodes accordingly.

For the purposes of illustration (with no limitation intended), using the dimensions shown in FIG. 2B (g=7.5 mm), the values of R1, R2, yielding $\chi$=1.1 and 1.5 are tabulated in the table below. Thus, it is demonstrated that LP-segmented-FAIMS can transmit ions with a range of E/N values determined only by $\chi$. The strength of focusing in the gap centre can also be defined in terms of the gradient of the electrical field. For the case of the cylindrical field case, the gradient of the electrical field is given by $4/\ln(\chi)/R2+R1)^2$. That is an ion with selected K(E/N) dependence is focused towards equal field contour of selected radius between R1 and R2.

TABLE 2

Focusing strength as a function of $\chi$.

| | R1 (mm) | R2 (mm) | Focusing Strength Td/V cm |
|---|---|---|---|
| $\chi = 1.1$ | 75 | 82.5 | $2.08 \times 10^{-4}$ |
| $\chi = 1.5$ | 15 | 22.5 | $8.61 \times 10^{-4}$ |

Figure 6A:
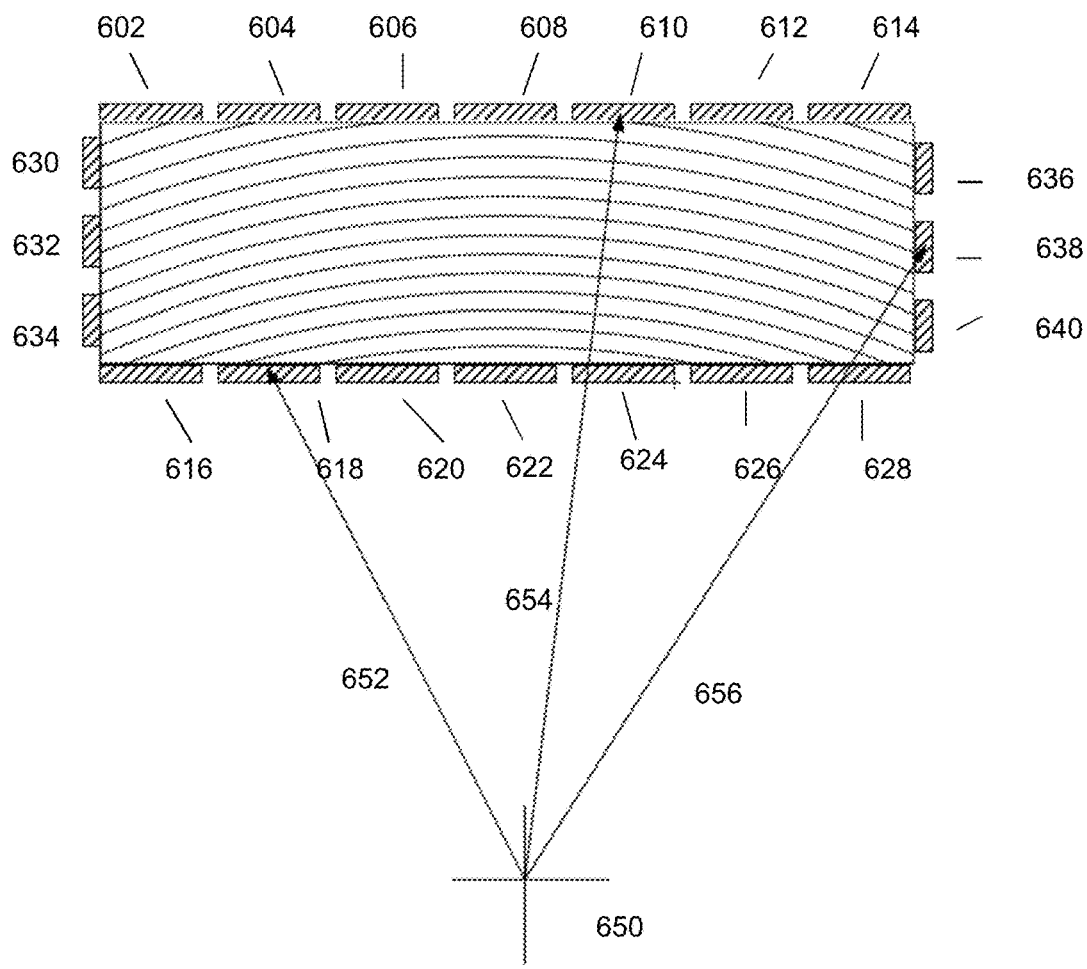
FIGS. 6A-B show another exemplary FAIMS device and exemplary equi-potentials.
Figure 6B:
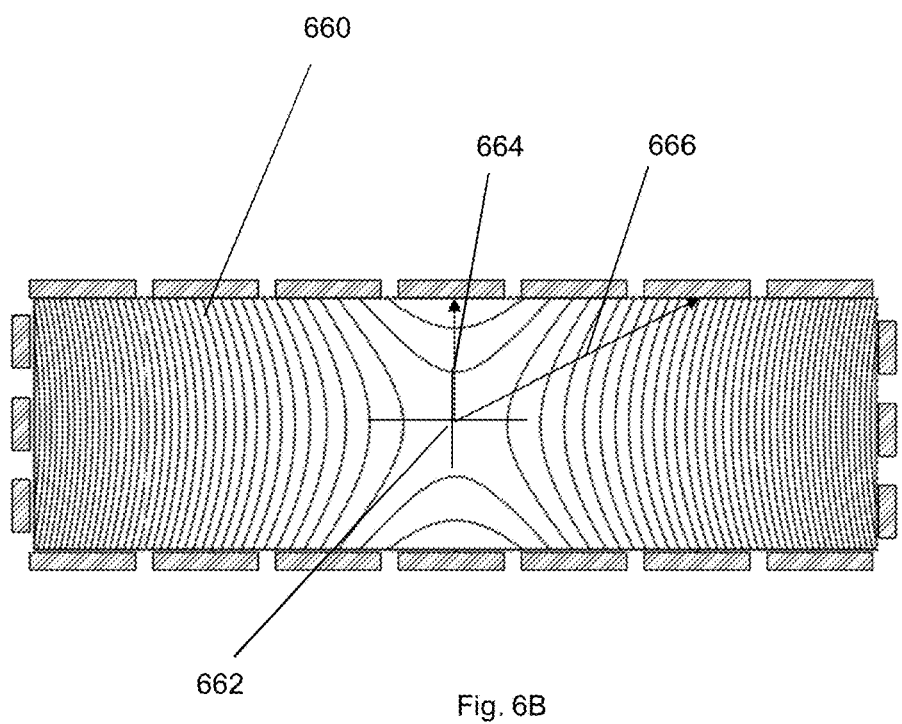

FIGS. 6A-B show another exemplary planar FAIMS device.

In this example, the planar FAIMS device comprises first and second sets of segmented electrodes 602 to 614 and 616 to 628 arranged in parallel planes and third and fourth sets of segmented electrodes 630 to 634 and 636 to 640 in two parallel planes orthogonal to the first set.

FIG. 6A shows this planar FAIMS device being used to create a suitable cylindrical electrical field. The necessary voltage on each electrode is determined using equation (2). The centre of curvature 650 lies on the line bisecting the central electrodes 622 and 608 of the longer set, at the distance R1 from the inner face of electrode 622. The equipotential contours per equation (2) are shown in the FAIMS gap for the potentials of 0 on inner and unity on outer electrode. The voltages on other electrodes are derived from equation (2) for the coordinates of the centre of inner face as exemplified by vectors 652, 654, 656 for respective electrodes 618, 610, 638. The resulting contours substantially replicate those in FIGS. 5A(i)-5B for the desired $\chi$ value.

The same planar FAIMS device can be operated in transparent mode using a quadrupole field 660 with origin 664 in the geometrical centre of the gap, e.g. as shown in FIG. 6B. The shown equipotential contours are again evaluated at the centres of electrode inner faces (assuming the symmetric waveform with d=0.5), as exemplified by vectors 664 and 666.

Figure 7A:
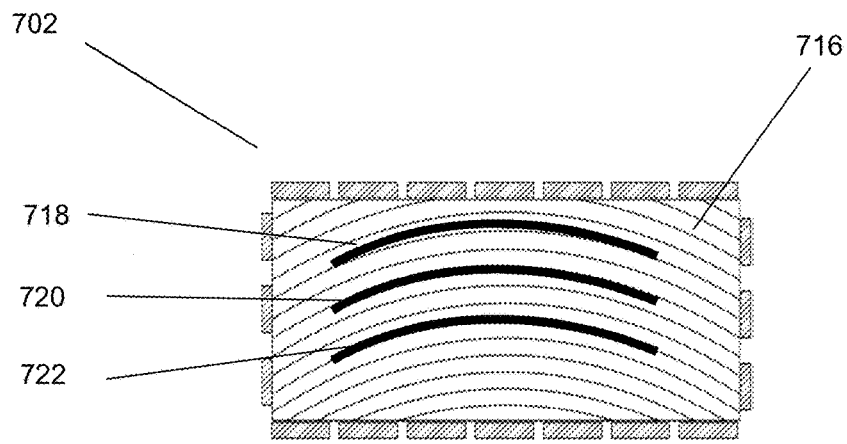
FIGS. 7A-D illustrate the FAIMS device of FIGS. 6A-B operated in a separation mode with focusing (focussing being provided contour lines of the electrical field strength) compared with a non-segmented planar LP-FAIMS without any electrical field gradient or focussing.
Figure 7B:
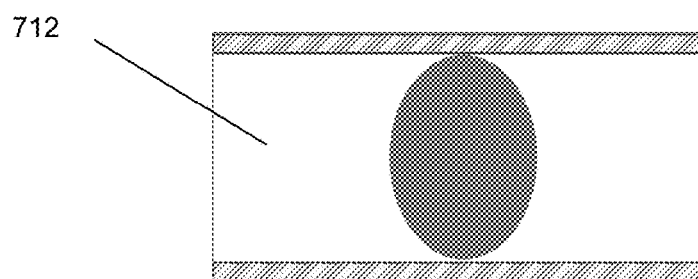
Figure 7C:
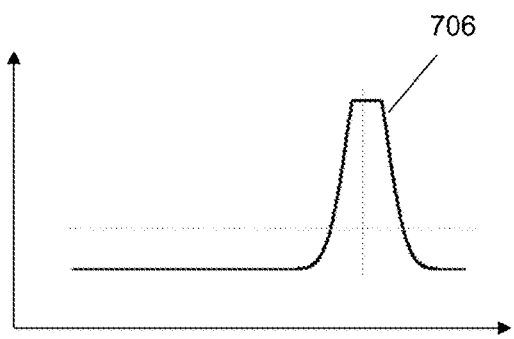
Figure 7D:
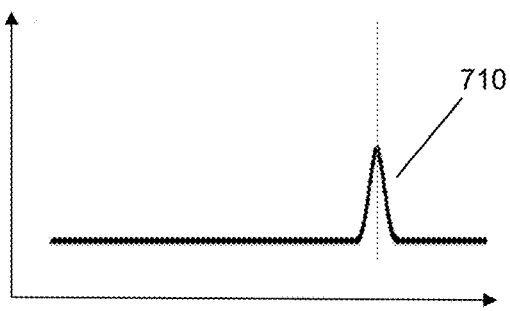

FIGS. 7A-D illustrate the segmented planar LP-FAIMS device of FIGS. 6A-B operated in a separation mode with focusing (focussing being provided by the cylindrical field) compared with a segmented planar LP-FAIMS without focussing. The ions in cylindrical field of device FIG. 6A (here labelled 702) form distinct domains disposed along the equipotential contours 716. These distinct domains shift across the gap depending on the applied $E_C/N$, e.g., from 718 to 720 to 722 with increasing applied $E_C/N$. Measuring the intensity (y-axis) of ions that pass through the FAIMS gap as a function of applied $E_C/N$ (x-axis) yields the FAIMS spectrum 706 of FIG. 7C. Like with true cylindrical gaps, the peaks are broadened because each ion species is similarly stable in the gap over a finite $E_C/N$ range. However, the focusing prevents ion loss due to diffusion in a direction parallel to the electric field. With a standard planar-gap FAIMS 714 (known in the art), the homogeneous electric field permits only a single species with defined $E_C/N$ to equilibrate anywhere in the gap. However, the ion packets 712 spread out because of free diffusion as shown in FIG. 7B, more so in a direction parallel to the electric field than in directions orthogonal to the electric field. The resulting FAIMS spectrum 710 has a narrower less intense peak as shown in FIG. 7D.

More specifically as shown by FIG. 8A(i), the curved ion domain 804 (shown in the plane orthogonal to the direction of ion flux through the device 808) expands above and below the projection 832 of narrow exit slit 810 disposed along the gap median. In the perpendicular projected view shown in FIG. 8A(ii), the focusing vertically compresses ion plumes that have entered through the FAIMS device inlet 802 as they proceed toward the outlet 830, approaching the steady-state shape governed by equipotential contours as described above. A fraction of ions approaching the gap exit passes through the slit 810 (shaped to minimise the disturbance of gas flow in 808) to the ion transfer stage 812. The pressures on both sides of slit 810 are preferably close. As the applied $E_C/N$ is scanned (in either increasing or decreasing directions), the curved ion domain moves across the linear gap and ions pass the slit 810 over a finite CV range. This broadens the FAIMS spectral peaks and reduces their intensity as shown in FIG. 8A(iii), which is not ideal.

As shown in FIG. 8B(*i*), the segmented planar LP-FAIMS stage 820 with near-linear field in the centre (established as above) focuses ions to a linear domain 818 disposed along the gap span. This means a vertically shorter steady-state plume that can pass through the exit slit 826 over a narrower $E_C/N$ range or even at a single $E_C/N$, as shown in FIG. 8B(ii). This yields narrower more intense peaks 816 in FAIMS spectra, as shown in FIG. 8B(iii).

3) Relating to Third Aspect of the Invention

Figure 9A:
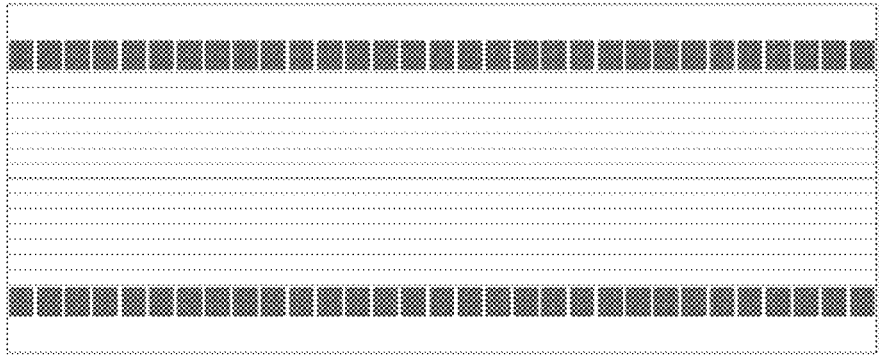
FIG. 9A-9B show a segmented planar FAIMS device in which all segments of each electrode carry equal potentials
Figure 9B:
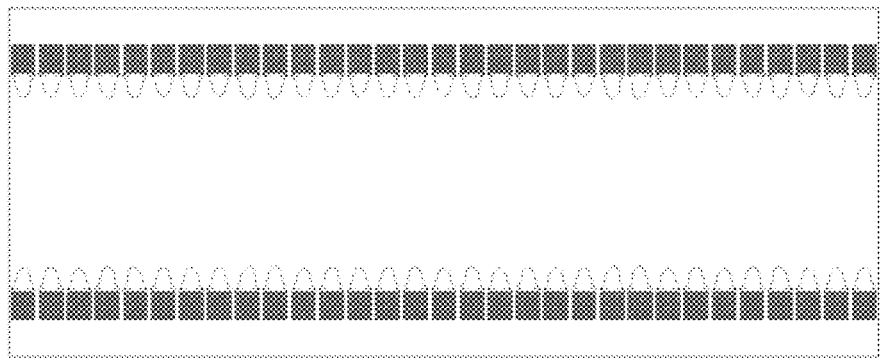

FIG. 9A-9B show a segmented planar FAIMS device in which all segments of each electrode carry equal potentials (positive on one electrode and negative on the other). The resulting equipotential and field strength contours, found by numerically solving the Laplace equation using finite difference methods, are plotted in FIG. 9*a* and FIG. 9*b* respectively. The absence of field contours near the gap median indicates the absence of field gradient, i.e., electric field homogeneity across the gap. The contours near segment edges show minute gradients in areas with sparse ion populations and thus do not materially influence the FAIMS separation. Hence, this mode emulates standard planar-gap FAIMS devices of prior art.

Figure 10A:
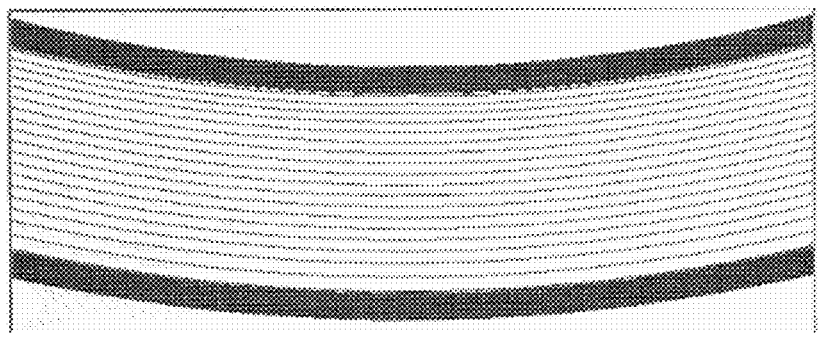
FIGS. 10A-D show equal field contours for different FAIMS device configurations.
Figure 10B:
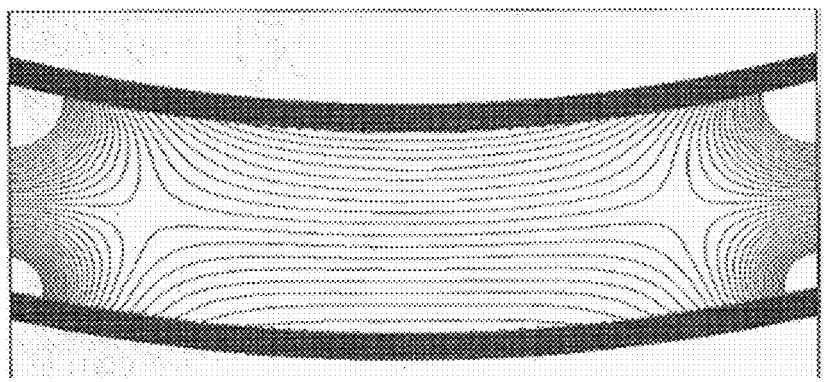
Figure 10C:
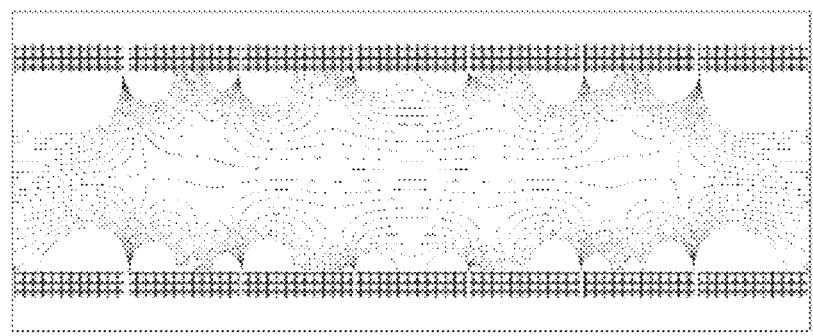
Figure 10D:
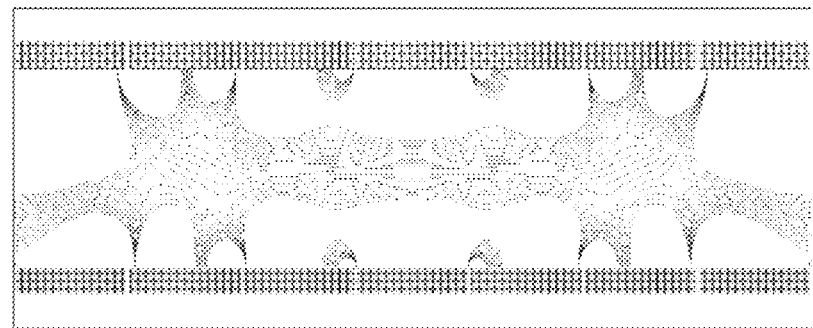

Detailing the numerically solved fields, FIG. 10A shows the equal field contours for a segment of ideal cylindrical field in the annular gap between full cylindrical electrodes that do not terminate (e.g. as depicted in FIG. 5B). Terminating those cylindrical electrodes at w=4 g (with open gap on the sides) renders the contours near the gap centre substantially planar and parallel as shown in FIG. 10B. A planar FAIMS stage with an open gap of same wig ratio and seven segments in each electrode carrying suitable voltages (calculated as above) features similar planar parallel field contours near the gap centre over a broad range of equivalent R2/R1 values, e.g. for R2/R1=1.15 as shown in FIG. 10C, and R2/R1=1.6 as shown in FIG. 10D.

Other methods providing substantially planar parallel field contours over a limited region of FAIMS gap exist, and the above example intends no limitation. This aspect of the invention may create an E/N gradient substantially similar to that produced by differential electrode heating in a planar FAIMS device, but has the multiple advantages described above. An exit slit restricting the paths of ions that can leave the gap and be detected by MS or other downstream stage makes the curved not parallel field contours away from the gap centre essentially immaterial.

The operational pressure can be down to several mbar, with experimental data at 6.2 mbar presented in Section 8. Even at extreme $E_D/N$ up to 543 Td, the signal for proteins ranging from small to large is substantial, especially in the lower charge states. This regime of ultralow pressures, lower than hitherto expected as feasible by us or other practitioners of FAIMS, may offer unique advantages for separations and studies of macromolecular conformations.

Supporting/Comparative Data

FIGS. 11A-D show simulations of segmented planar LP-FAIMS devices operated in a transparent mode. These simulations were made using the SIMION software in the statistical diffusion simulation (SDS) mode. Simulations were for the protonated papaverine (1+) ion of 340 Da mass with the experimental K(E/N) dependence. The buffer gas was N2 at 33 mbar pressure and 43° C. temperature, with the axial flow speed of 10 m/s and lateral speed of zero. The cell had g=7.5 mm, w=30 mm for w/g=4, and length (L) of 100 mm, leading to the filtering time of t=10 ms. The frequency of symmetric rectangular waveform was 200 kHz. The SDS model assumes the steady-state mobility regime (i.e., ions drifting at terminal velocity controlled by the instant field), corresponding to high pressure and low RF frequency. Then γ approaches zero and the ion confinement is poor, still the ion loss to the FAIMS electrodes in this simulation was limited.

Figure 11A:
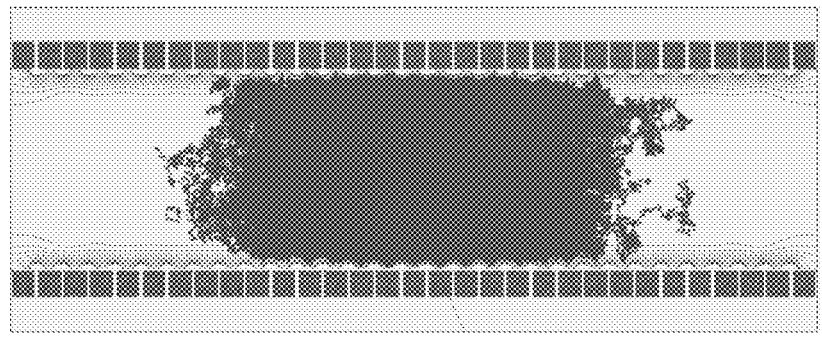
FIGS. 11A-D show simulations of segmented planar LP-FAIMS devices operated in transparent modes.

The example shown in FIG. 11A has 31-segment electrodes with the voltages applied per FIG. 3C at peak RF amplitude of 50 V. The equal electrical field contours are plotted at 50 V/cm intervals. The trajectories shown with infinite persistence. So the panels show the maximum lateral extent of 1,000 ions during the simulated time period of 10 ms. The ions initial positions of the ions were close to the axis.

Figure 11B:
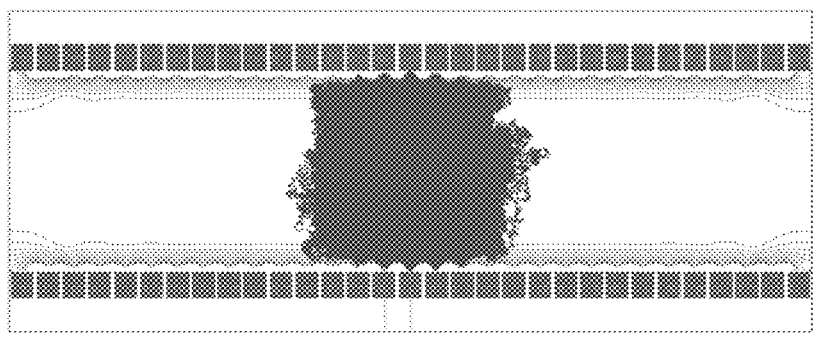
Figure 11C:
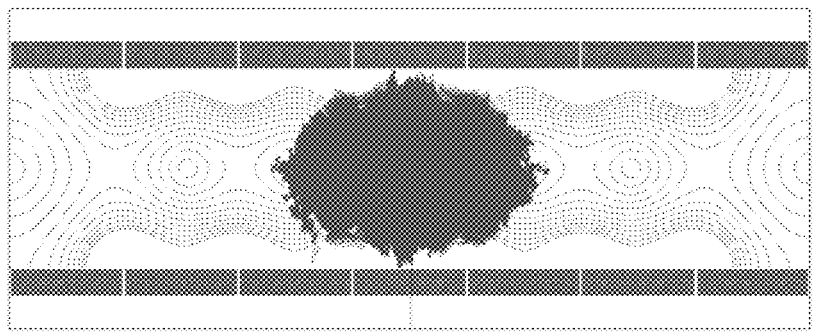

In FIG. 11B, the RF voltages are applied as per FIG. 3C and are additionally complemented by dc voltages providing a gradient that pushes ions toward the device central axis: the ions are confined in y direction by the RF field and x direction by the dc field. The result with 7-segment electrodes at otherwise same conditions is shown in FIG. 11C.

Figure 11D:
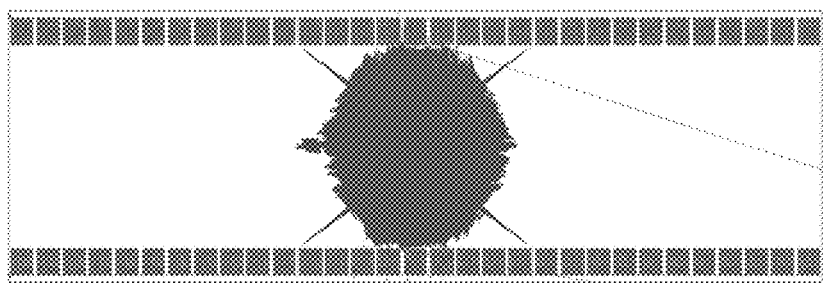

An embodiment with quadrupole field, provided by voltages applied per FIG. 3B with peak amplitude of 200 V, is modelled in FIG. 11D. The ion trajectories were recorded as described above. The ion loss to electrodes over the simulation time was 7%, even withstanding the limitation of these simulation as described above. The quadrupole field confines ions better, but requires a higher voltage in same mass range. This superior confinement toward the central axis is alternatively achievable by reducing the pressure and increasing the frequency as described (simulations not shown).

Figure 12:
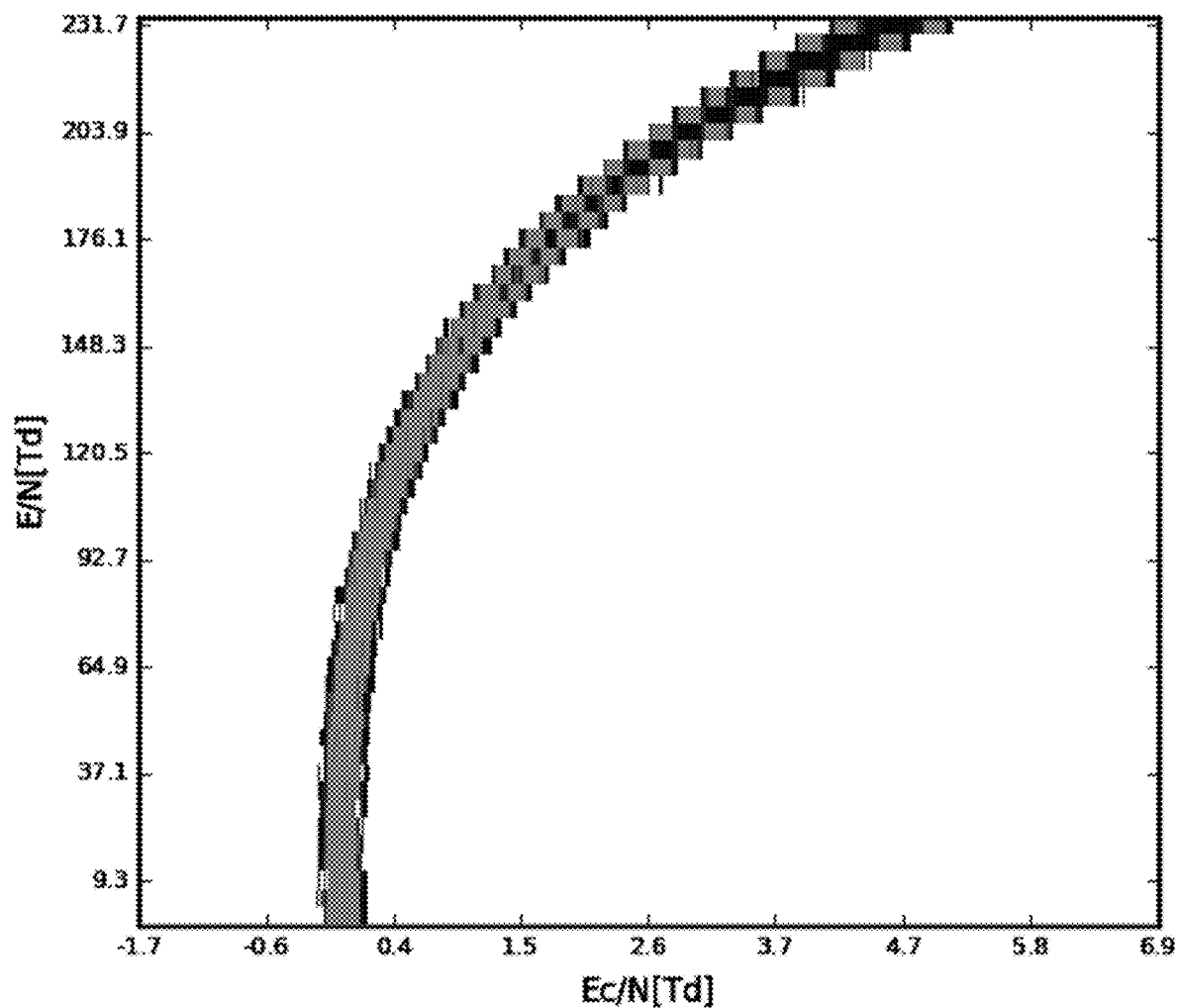
FIG. 12 shows a CV(DV) curve resulting from simulations of a FAIMS separation mode without field gradient.

We further simulated the FAIMS separation mode with linear field gradient per FIG. 10C (R2/R1=1.15), assuming the asymmetric waveform with 200 kHz frequency and d=0.2, and other conditions per FIGS. 11A-D. All ions passing the gap exit plane were counted—i.e., no exit aperture (slit) was considered. The resulting CV(DV) curve in $E_C/N$ and $E_D/N$ terms as shown in FIG. 12 essentially matches that obtained for standard planar-gap FAIMS. However, the width and intensity of $E_C/N$ peak now increase at higher $E_D/N$.

Exemplary measurements employed a planar LP-FAIMS device with somewhat smaller g (5 mm), w=20 mm for same w/g=4, and equal L=100 mm, also with no exit slit. The ion focusing was achieved by applying a thermal gradient between the electrodes, and thus providing a linear field gradient, and this mimicking that aspect of the current invention. The filtering time was set longer, to 50 ms.

Figure 13:
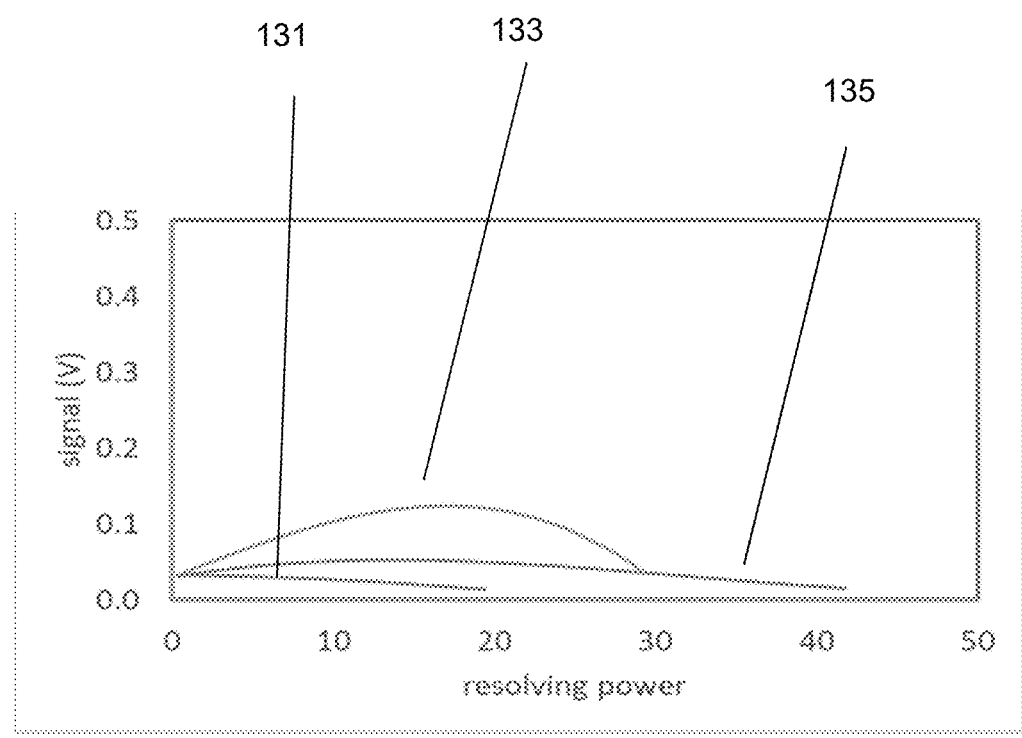
FIG. 13 shows a resolution/sensitivity diagram resulting from experiments performed using a planar LP-FAIMS device (with and without a linear field gradient)

The resolution/sensitivity diagram (showing the resolving power vs. signal) were measured over full $E_D/N$ range at three equivalent R2/R1 values as shown in FIG. 13, with curves 131 at R2/R1=1 (no focusing), 133 at R2/R1=1.03 (very weak focusing), and 135 at R2/R1=1.07 (weak). The very weak and particularly weak focusing substantially raise the signal over the no-focusing baseline at same resolution across full R range, by up to ~10× with weak focusing (at R=19). The very weak and particularly weak focusing can also improve the resolving power at equal sensitivity—e.g., to the maximum R=43 from 19 with no focusing at same signal level.

This example clearly demonstrates major advantages of flexible ion focusing in LP-FAIMS in ways that materially and qualitatively supersede the understanding of prior art in experiment or theory. That is, the focusing (implemented either via physical gap curvature or physical gap curvature+ temperature gradient) was widely observed to increase the transmission of all species through the FAIMS gaps and thus the measured signal at the cost of resolution, in line with reported first-principles calculations and numerical simulations (e.g. [11]). In other words, the ion focusing has been understood and expected to move the FAIMS performance within the space delineated by resolution/sensitivity curve for the no-focusing case, trading off the resolution for sensitivity. Present demonstrations of sensitivity gain at equal resolution, or resolution gain at equal sensitivity, or gains of both as shown in FIG. 13 are fundamentally beyond the state of the art. The addition of the exit split will provide further gains in the resolution/sensitivity balance with respect to any prior art.

Figure 14A:
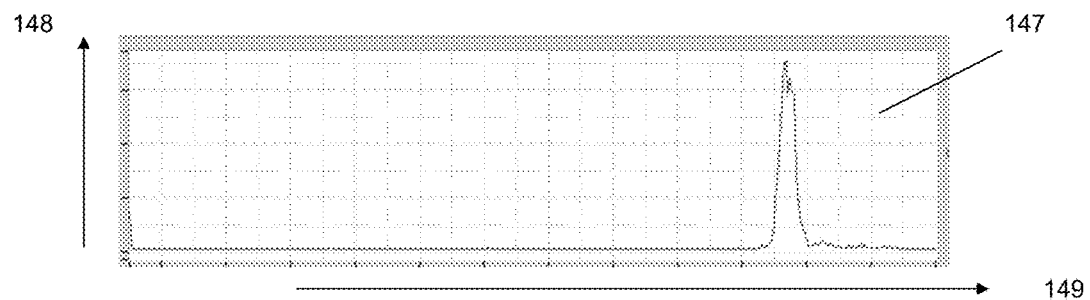
FIGS. 14A-B show further results from experiments performed using a planar LP-FAIMS device.
Figure 14B:
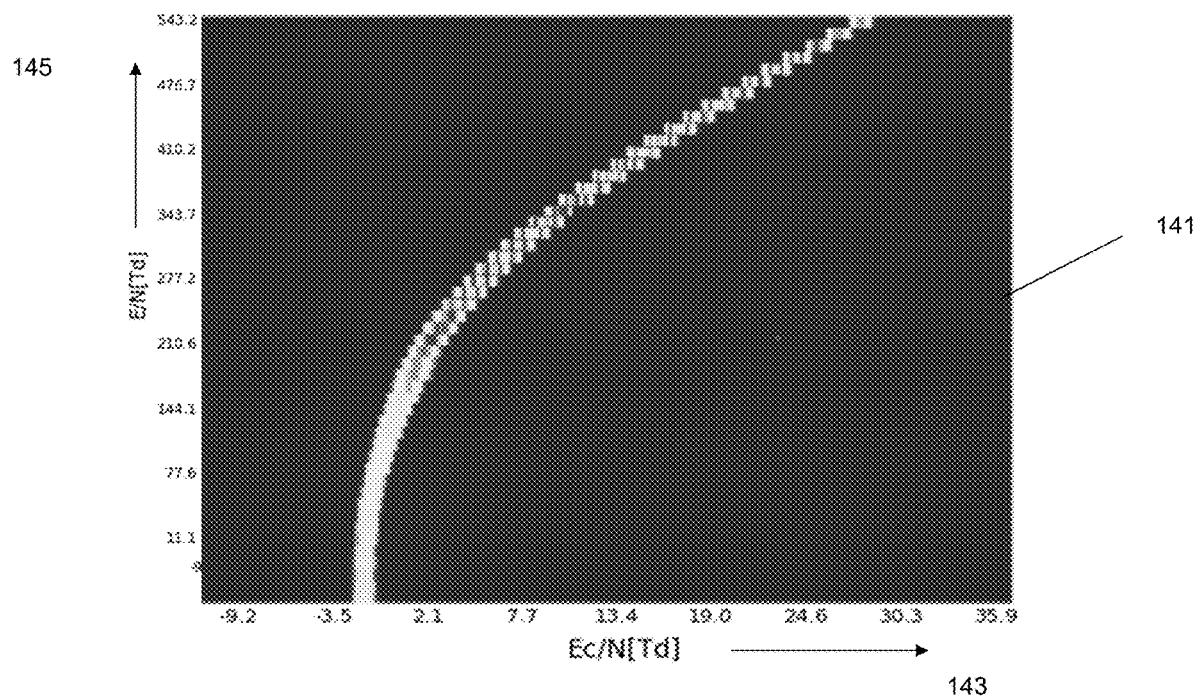

Further experiments explored the lower limits of useful FAIMS pressure range, employing the planar LP-FAIMS device with g=7.5 mm, w=30 mm, and L=126 mm, driven by the waveform with 50 kHz frequency and d=0.2. In particular, data for representative proteins were obtained at a pressure of 6.2 mbar with low, 10 ms, filtering time as shown in FIGS. 14A-B. The exemplary 2-D palette 141 for protonated bovine ubiquitin (8.6 kDa) in the 6+ charge state, with the horizontal axis 143 for $E_C/N$ and vertical axis 145 for $E_D/N$, exhibits substantial signal with excellent s/n ratio up to the electrical breakdown limit at $E_D/N$=543 Td as seen in $E_C/N$ spectrum 147, having horizontal axis 149 for $E_C/N$ and vertical axis 148 for ion signal. The FAIMS analyses in this E/N range are unprecedented, with none above 300 Td known in the prior art.

This previously unachievable regime allows investigating and exploiting many new phenomena and separations. For example, two distinct $E_C(E_D)$ curves, presumably revealing different conformational or protonation scheme isomers—protomers are evident in FIG. 14. The resolving power is up to 30, which exceeds the metrics achievable at lower $E_D/N$ and is competitive for proteins that normally comprise multiple unresolved conformers. For larger proteins and other macromolecules, useful operation should extend to yet lower pressures permitting still higher E/N, down to P~1 mbar and E/N more than 1000 Td.

Possible Modifications and Applications

The segmented LP-FAIMS electrodes could be slightly curved. Voltages applied to a slight curved electrode could be used to weaken or to strengthen the ion focusing provided by the voltage gradients according to this invention.

The invention is preferably used in LP-FAIMS as transparent mode where user doesn't need to remove physically device from a mass spectrometer which normally would decrease transmission. This will increase attractiveness of use of LP-FAIMS for users which will be less afraid of problems which could be caused by reduction of mass spectrometer sensitivity.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

[1] U.S. Pat. No. 8,610,054B2 (Shimadzu)
[2] U.S. Pat. No. 7,863,562B2 (Shimadzu)
[3] R. W. Purves, et al., *Rev. Sci. Instrum.* 1998, 69, 4094
[4] I. A. Buryakov, et al., *Int. J. Mass Spectrom. Ion Processes* 1993, 128, 143
[5] http://www.faims.com/howpart1.htm
[6] A. A. Shvartsburg et al., *J. Am. Soc. Mass Spectrom.* 2013, 24, 109
[7] A. A. Shvartsburg et al., *Anal. Chem.* 2018, 90, 936
[8] U.S. Pat. No. 6,107,628
[9] Y. Ibrahim et al., J. Am. Soc. Mass Spectrom. 2006, 17, 1299
[10] A. V. Tolmachev, Nucl. Instrum. Methods Phys. Res. B 1997, 124, 112; Y. Ibrahim et al., ibid
[11] A. A. Shvartsburg et al., Anal. Chem. 2006, 78, 3706
[12] U.S. Pat. No. 7,045,778B2
[13] U.S. Pat. No. 7,550,717B2

The following statements, which form part of the description, provide general expressions of the disclosure herein:

A1. A device for performing field asymmetric waveform ion mobility spectrometry, "FAIMS", the device comprising:
  a first segmented planar electrode including three or more segments, wherein the segments of the first segmented planar electrode are arranged in a first plane and extend in a direction parallel to an analytical axis of the device;
  a second segmented planar electrode including three or more segments, wherein the segments of the second segmented planar electrode are arranged in a second plane and extend in a direction parallel to the analytical axis of the device, wherein the first segmented planar electrode and the second segmented electrode are separated from each other to provide an analytical gap therebetween;

propelling means for propelling ions through the analytical gap in a direction parallel to the analytical axis of the device; and a power supply;

wherein the device is configured to operate in:
- a FAIMS mode in which the power supply applies a first set of voltage waveforms to the segments of the first and second segmented planar electrodes so as to produce an asymmetric time dependent electric field in the analytical gap for FAIMS analysis of ions propelled through the analytical gap by the propelling means;
- a transparent mode in which the power supply applies a second set of voltage waveforms to the segments of the first and second segmented planar electrodes so as to produce a confining electric field in the analytical gap for focussing ions towards the longitudinal axis.

A2. A device according to statement A1, wherein the gas controller is configured to provide a gas pressure in the analytical gap such that the gas pressure in the analytical gap is lower in the transparent mode compared with the FAIMS mode.

A3. A device according to statement A1 or A2, wherein the gas controller is configured to provide, in the FAIMS mode, a gas pressure in the analytical gap that is 1-200 mbar.

A4. A device according to any previous statement, wherein the gas controller is configured to control the supply of gases to the analytical gap such that the analytical gap contains a mixture of gases, wherein the mixture of gases includes two or more of N2, H, He.

A5. A device according to any previous statement, wherein the pressure controller is configured to provide, in the transparent mode, a gas pressure in the analytical gap that is 20 mbar or less.

6. A device according to any previous statement, wherein the first set of voltage waveforms repeat at a first frequency and the second set of voltage waveforms repeat at a second frequency, wherein the first frequency is lower than the second frequency.

A7. A device according to any previous statement, wherein the first frequency is in the range 5 kHz-5 MHz, and the second frequency is 500 kHz or higher.

A8. A device according to any previous statement, wherein the first voltage waveforms and the second voltage waveforms are substantially rectangular.

A9. A device according to any previous statement, wherein the power supply is a digital power supply.

A10. A device according to any previous statement, wherein the device is configured to operate in the FAIMS mode with a duty cycle of less than or greater than 0.5.

A11. A device according to any previous statement, wherein the power supply is configured to apply the first set of voltage waveforms to the segments of the first and second segmented planar electrodes by producing one or more RF voltage waveforms and applying said RF voltage waveforms to the segments of the first and second segmented planar electrodes via an arrangement of capacitive dividers.

A12. A device according to any previous statement, wherein the power supply is configured to change the frequency of voltage waveforms applied to the segments of the segmented planar electrodes from a first frequency value to a second frequency value substantially instantly.

A13. A device according to any previous statement, wherein the power supply is configured to change the f-value of voltage waveforms applied to the segments of the segmented planar electrodes from a first f-vale to a second f-value substantially instantly.

A14. A device according to any previous statement, wherein the second voltage waveforms have a duty cycle of 0.5.

A15. A device according to any previous statement, wherein w≥3 g, where w is the width of the analytical gap in a gap width direction, and g is the height of the analytical gap in a gap height direction.

A16. A device according to any previous statement, including the features of any of statements B1-B17 and/or statements C1-11.

B1. A device for performing field asymmetric waveform ion mobility spectrometry, "FAIMS", the device comprising:
- a first segmented planar electrode including three or more segments, wherein the segments of the first segmented planar electrode are arranged in a first plane and extend in a direction parallel to an analytical axis of the device;
- a second segmented planar electrode including three or more segments, wherein the segments of the second segmented planar electrode are arranged in a second plane and extend in a direction parallel to the analytical axis of the device, wherein the first segmented planar electrode and the second segmented electrode are separated from each other to provide an analytical gap therebetween;
- propelling means for propelling ions through the analytical gap in a direction parallel to the analytical axis of the device; and
- a power supply;
- wherein the device is configured to operate in a FAIMS mode in which the power supply applies a set of voltage waveforms to the segments of the first and second segmented planar electrodes so as to produce an asymmetric time dependent electric field in the analytical gap for FAIMS analysis of ions propelled through the analytical gap by the propelling means;
- wherein the set of voltage waveforms are configured such that the asymmetric time dependent electric field has curved contours of equal field strength when viewed in a plane perpendicular to the analytical axis so as to focus ions having different differential mobilities towards different spatial domains, wherein each spatial domain extending along a respective curved contour of equal field strength when viewed in a plane perpendicular to the analytical axis;
- wherein the device has a focus controller configured to allow a user to change the curvature of the contours of equal field strength so as to change the strength of focussing provided by the asymmetric time dependent electric field.

B2. A device according to statement B1, wherein the curved contours of equal field strength correspond to an electric field produced in a space between two coaxial cylindrical electrodes, wherein the external radius of the inner cylindrical electrode is R1 and the internal radius of the outer cylindrical electrode is R2.

B3. A device according to statement B1 or B2, wherein the focus controller is configured to allow a user to change the ratio R2/R1 of the cylindrical electrical field in the analytical gap of the FAIMS device.

B4. A device according to any previous statement, wherein the focus controller is configured to allow a user to change the ratio R2/R1 of the cylindrical electrical field in the analytical gap of the FAIMS device.

B5. A device according to any previous statement, wherein the first and second segmented planar electrodes are arranged on opposite sides of the analytical gap.

B6. A device according to any previous statement, wherein the device further comprises:
  a third segmented planar electrode including two or more segments, wherein the segments of the third segmented planar electrode are arranged in a third plane and extend in a direction parallel to an analytical axis of the device;
  a fourth segmented planar electrode including two or more segments, wherein the segments of the fourth segmented planar electrode are arranged in a fourth plane and extend in a direction parallel to an analytical axis of the device;
  wherein the first and second segmented planar electrodes are arranged on opposite sides of the analytical gap and are separated from each other in a gap width direction that is perpendicular to the analytical axis;
  wherein the third and fourth segmented electrodes are arranged on opposite sides of the analytical gap and are separated from each other in a gap height direction that is perpendicular to the analytical axis and the gap width direction.

B7. A device according to statement B6, wherein w>~8 g.

B8. A device according to any previous statement, wherein the gas controller is configured to provide, in the FAIMS mode, a gas pressure in the analytical gap that is: 1-200 mbar.

B9. A device according to any previous statement, wherein the device includes a barrier having an exit slit, wherein the barrier is located on the analytical axis such that the propelling means propels ions towards the barrier, wherein the barrier is configured to prevent ions from reaching a detector of the device unless they pass through the exit slit.

B10. A device according to statement B9, wherein the barrier is configured to be removed.

B11. A device according to statement B9 or B10, the device is configured to permit adjustment of the width of the exit slit provided by the barrier.

B12. A device according to any of statements B9 to B11, wherein the device is configured to permit adjustment of the curvature of the exit slit provided by the barrier.

B13. A device according to any of statements B9 to B12, wherein the exit slit has a curvature which corresponds to the curvature of a curved contour of equal field strength of the asymmetric time dependent electric field when viewed in a plane perpendicular to the analytical axis.

B14. A device according to any previous statement, wherein the device is configured to operate in:
  a FAIMS mode in which the power supply applies a first set of voltage waveforms to the segments of the first and second segmented planar electrodes so as to produce an asymmetric time dependent electric field in the analytical gap for FAIMS analysis of ions propelled through the analytical gap by the propelling means; and
  a transparent mode in which the power supply applies a second set of voltage waveforms to the segments of the first and second segmented planar electrodes so as to produce a confining electric field in the analytical gap for focussing ions towards the longitudinal axis.

B15. A device according to any previous statement, wherein the power supply is configured to apply a set of additional DC voltages, referred to as the compensation voltages ("CVs"), to all the segments at the same time as the first and second sets of voltage waveforms.

B16. A device according to statement B15, wherein the CVs have predetermined values configured to cause ions having a predetermined differential mobility to exit via an exit slit.

B17. A device according to statement B15 or B16, wherein the device is configured to scan the CVs to cause ions having different predetermined differential mobilities to exit via an exit slit at different times.

B18. A device according to any previous statement, including the features of any of statements A1-A15 and/or statements C1-11.

C1. A device for performing field asymmetric waveform ion mobility spectrometry, "FAIMS", the device comprising:
  a first segmented planar electrode including three or more segments, wherein the segments of the first segmented planar electrode are arranged in a first plane and extend in a direction parallel to an analytical axis of the device;
  a second segmented planar electrode including three or more segments, wherein the segments of the second segmented planar electrode are arranged in a second plane and extend in a direction parallel to the analytical axis of the device, wherein the first segmented planar electrode and the second segmented electrode are separated from each other to provide an analytical gap therebetween;
  propelling means for propelling ions through the analytical gap in a direction parallel to the analytical axis of the device; and
  a power supply;
  wherein the device is configured to operate in a FAIMS mode in which the power supply applies a first set of voltage waveforms to the segments of the first and second segmented planar electrodes so as to produce an asymmetric time dependent electric field in the analytical gap for FAIMS analysis of ions propelled through the analytical gap by the propelling means;
  wherein the set of voltage waveforms are configured such that the asymmetric time dependent electric field has substantially straight contours of equal field strength when viewed in a plane perpendicular to the analytical axis so as to focus ions having different differential mobilities towards different spatial domains, wherein each spatial domain extending along a respective linear contour of equal field strength when viewed in a plane perpendicular to the analytical axis.

C2. A device according to statement C1, the device has a focus controller configured to allow a user to change the gradient of the contours of equal field strength so as to change the strength of focussing provided by the asymmetric time dependent electric field.

C3. A device according to any previous statement, wherein the device includes a barrier having an exit slit, wherein the barrier is located on the analytical axis such that the propelling means propels ions towards the barrier, wherein the barrier is configured to prevent ions from exiting the analytical gap unless they pass through the exit slit.

C4. A device according to statement C3, wherein the barrier is configured to be removed.

C5. A device according to statement C3 or C4, the device is configured to permit adjustment of the width of the exit slit provided by the barrier.

C6. A device according to any one of statements 3 to 5, wherein the exit slit is linear and extends in a direction which corresponds to a linear contour of equal field strength of the asymmetric time dependent electric field when viewed in a plane perpendicular to the analytical axis.

C7. A device according to any previous statement, wherein the substantially straight contours of equal field strength are substantially straight over a distance of w/4 or more, wherein w is the width of the analytical gap in a gap width direction.

C8. A device according to any previous statement, wherein the power supply is configured to apply a set of additional DC voltages, referred to as the compensation voltages ("CVs"), to all the segments at the same time as the first and second sets of voltage waveforms.

C9. A device according to statement C8, wherein the CVs have a predetermined value configured to cause ions having a predetermined differential mobility to exit via an exit slit.

C10. A device according to statement C8 or C9, wherein the device is configured to scan the CVs to cause ions having different predetermined differential mobilities to exit via an exit slit at different times.

C11. A device according to any previous statement, wherein the device is configured to operate in:
  a FAIMS mode in which the power supply applies a first set of voltage waveforms to the segments of the first and second segmented planar electrodes so as to produce an asymmetric time dependent electric field in the analytical gap for FAIMS analysis of ions propelled through the analytical gap by the propelling means; and
  a transparent mode in which the power supply applies a second set of voltage waveforms to the segments of the first and second segmented planar electrodes so as to produce a confining electric field in the analytical gap for focussing ions towards the longitudinal axis.

C12. A device according to any previous statement, including the features of any of statements A1-A15 and/or statements B1-17.

The invention claimed is:

1. A device for performing field asymmetric waveform ion mobility spectrometry, "FAIMS", the device comprising:
  a first segmented planar electrode including three or more segments, wherein the segments of the first segmented planar electrode are arranged in a first plane and extend in a direction parallel to an analytical axis of the device;
  a second segmented planar electrode including three or more segments, wherein the segments of the second segmented planar electrode are arranged in a second plane and extend in a direction parallel to the analytical axis of the device, wherein the first segmented planar electrode and the second segmented electrode are separated from each other to provide an analytical gap therebetween;
  propelling means for propelling ions through the analytical gap in a direction parallel to the analytical axis of the device; and
  a power supply;
  wherein the device is configured to operate in:
    a FAIMS mode in which the power supply applies a first set of voltage waveforms to the segments of the first and second segmented planar electrodes so as to produce an asymmetric time dependent electric field in the analytical gap for FAIMS analysis of ions propelled through the analytical gap by the propelling means;
    a transparent mode in which the power supply applies a second set of voltage waveforms to the segments of the first and second segmented planar electrodes so as to produce a confining electric field in the analytical gap for focussing ions towards the longitudinal axis;
  wherein the first set of voltage waveforms repeat at a first frequency and the second set of voltage waveforms repeat at a second frequency, wherein the first frequency is lower than the second frequency.

2. A device according to claim 1, further comprising a gas controller for controlling the gas pressure in the analytical gap wherein the gas controller is configured to provide a gas pressure in the analytical gap such that the gas pressure in the analytical gap is lower in the transparent mode compared with the FAIMS mode.

3. A device according to claim 1, further comprising a gas controller for controlling the gas pressure in the analytical gap wherein the gas controller is configured to provide, in the FAIMS mode, a gas pressure in the analytical gap that is 1-200 mbar.

4. A device according to claim 1, further comprising a gas controller for controlling the gas pressure in the analytical gap wherein the gas controller is configured to control the supply of gases to the analytical gap such that the analytical gap contains a mixture of gases, wherein the mixture of gases includes two or more of N2, H, He.

5. A device according to claim 1, further comprising a pressure controller configured to provide, in the transparent mode, a gas pressure in the analytical gap that is 20 mbar or less.

6. A device according to claim 1, wherein the first frequency is in the range 5 kHz-5 MHz, and the second frequency is 500 kHz or higher.

7. A device according to any claim 1, wherein the first voltage waveforms and the second voltage waveforms are substantially rectangular.

8. A device according to claim 1, wherein the power supply is a digital power supply.

9. A device according to claim 1, wherein the device is configured to operate in the FAIMS mode with a duty cycle of less than or greater than 0.5.

10. A device according to claim 1, wherein the power supply is configured to apply the first set of voltage waveforms to the segments of the first and second segmented planar electrodes by producing one or more RF voltage waveforms and applying said RF voltage waveforms to the segments of the first and second segmented planar electrodes via an arrangement of capacitive dividers.

11. A device according to claim 1, wherein the power supply is configured to change the frequency of voltage waveforms applied to the segments of the segmented planar electrodes from a first frequency value to a second frequency value substantially instantly.

12. A device according to claim 1, wherein the power supply is configured to change the f-value of voltage waveforms applied to the segments of the segmented planar electrodes from a first f-vale to a second f-value substantially instantly.

13. A device according to claim 1, wherein the second voltage waveforms have a duty cycle of 0.5.

14. A device according to claim 1, wherein w≥3 g, where w is the width of the analytical gap in a gap width direction, and g is the height of the analytical gap in a gap height direction.

* * * * *